(12) United States Patent
Iwasaki et al.

(10) Patent No.: US 10,793,755 B2
(45) Date of Patent: Oct. 6, 2020

(54) ADHESIVE SHEET AND ELECTRONIC DEVICE

(71) Applicant: DIC Corporation, Tokyo (JP)

(72) Inventors: Takeshi Iwasaki, Kita-adachi-gun (JP); Yumi Kagiyama, Kita-adachi-gun (JP); Hideaki Takei, Kita-adachi-gun (JP); Yuya Kitade, Kita-adachi-gun (JP); Yuki Komatsuzaki, Takaishi (JP); Tsunenori Hashiguchi, Takaishi (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/124,471

(22) PCT Filed: Mar. 12, 2015

(86) PCT No.: PCT/JP2015/057281
§ 371 (c)(1),
(2) Date: Sep. 8, 2016

(87) PCT Pub. No.: WO2015/137437
PCT Pub. Date: Sep. 17, 2015

(65) Prior Publication Data
US 2017/0015872 A1 Jan. 19, 2017

(30) Foreign Application Priority Data

Mar. 13, 2014 (JP) ................................ 2014-050180
Mar. 13, 2014 (JP) ................................ 2014-050181
Mar. 13, 2014 (JP) ................................ 2014-050182

(51) Int. Cl.
*C09J 133/08* (2006.01)
*C09J 133/00* (2006.01)
(Continued)

(52) U.S. Cl.
CPC ........... *C09J 133/08* (2013.01); *C08K 5/0025* (2013.01); *C08K 5/01* (2013.01); *C08K 5/13* (2013.01);
(Continued)

(58) Field of Classification Search
None
See application file for complete search history.

(56) References Cited

U.S. PATENT DOCUMENTS 4,751,108 A * 6/1988 Larimore ............. C09J 133/064
427/171
5,641,536 A * 6/1997 Lech .................... A61K 9/2826
427/2.14
(Continued)

FOREIGN PATENT DOCUMENTS

| CN | 101831252 A | 9/2010 |
| CN | 101857780 A | 10/2010 |

(Continued)

OTHER PUBLICATIONS

Aldrich Data Sheet (2017).*
(Continued)

*Primary Examiner* — Frank D Ducheneaux
(74) *Attorney, Agent, or Firm* — Westerman, Hattori, Daniels & Adrian, LLP

(57) ABSTRACT

An object to be achieved by the present invention is to provide an industrially useful adhesive sheet that can be used to bond various adherends and has excellent peel adhesion, excellent push strength, and excellent holding power under static load. The object of the present invention can be achieved by an adhesive sheet having, on one side or both side of a substrate, an adhesive layer (A) having a
(Continued)

tensile strength of 6 N/cm² or more as determined from a stress-strain curve (a so-called S-S curve) at a strain of 100%.

14 Claims, 1 Drawing Sheet

(51) Int. Cl.
    *C09J 7/20*          (2018.01)
    *C09J 7/26*          (2018.01)
    *C08K 5/01*          (2006.01)
    *C08K 5/13*          (2006.01)
    *C08K 5/134*        (2006.01)
    *C09J 133/06*       (2006.01)
    *C08K 5/00*          (2006.01)

(52) U.S. Cl.
    CPC ............... *C08K 5/134* (2013.01); *C09J 7/20* (2018.01); *C09J 7/26* (2018.01); *C09J 133/00* (2013.01); *C09J 133/064* (2013.01); *C09J 133/066* (2013.01); *C09J 2201/622* (2013.01); *C09J 2203/326* (2013.01); *C09J 2400/243* (2013.01); *C09J 2433/00* (2013.01)

(56) References Cited

U.S. PATENT DOCUMENTS

| | | | | |
|---|---|---|---|---|
| 6,218,017 | B1* | 4/2001 | Yamashita | B32B 9/00 428/424.2 |
| 6,630,239 | B2* | 10/2003 | Cernohous | C09J 121/00 428/355 R |
| 2004/0137222 | A1* | 7/2004 | Welke | C09J 7/0217 428/343 |
| 2007/0218276 | A1* | 9/2007 | Hiramatsu | C09J 7/385 428/354 |
| 2010/0233467 | A1* | 9/2010 | Niwa | C09J 4/00 428/323 |
| 2011/0112249 | A1* | 5/2011 | Takarada | C09J 7/00 525/123 |
| 2011/0130508 | A1* | 6/2011 | Pendley | C09J 175/04 524/507 |

FOREIGN PATENT DOCUMENTS

| | | |
|---|---|---|
| JP | 2004-196867 A | 7/2004 |
| JP | 2005-187513 A | 7/2005 |
| JP | 2007-91918 A | 4/2007 |
| JP | 2008-285554 A | 11/2008 |
| JP | 2009-74060 A | 4/2009 |
| JP | 2010-65095 A | 3/2010 |
| JP | 2010-254956 A | 11/2010 |
| JP | 2010-260880 A | 11/2010 |
| JP | 2011-168658 A | 9/2011 |
| JP | 2011-190439 A | 9/2011 |
| JP | 2013-40329 A | 2/2013 |
| JP | 5146712 B2 | 2/2013 |
| JP | 2013-56968 A | 3/2013 |
| KR | 10-2010-0109373 A | 10/2010 |
| KR | 10-2010-0112528 A | 10/2010 |
| TW | 201037053 A | 10/2010 |
| TW | 201040238 A1 | 11/2010 |
| WO | 2013/099755 A1 | 7/2013 |
| WO | 2013/141167 A1 | 9/2013 |
| WO | 2013/154137 A1 | 10/2013 |

OTHER PUBLICATIONS

Machine translation of JP 2010260880 A (2010).*
Aldrich Data Sheet (2018).*
Machine translation of JP 2011190439 A (Year: 2011).*
International Search Report dated Jun. 16, 2015, issued in counterpart International Application No. PCT/JP2015/057281 (2 pages).

* cited by examiner

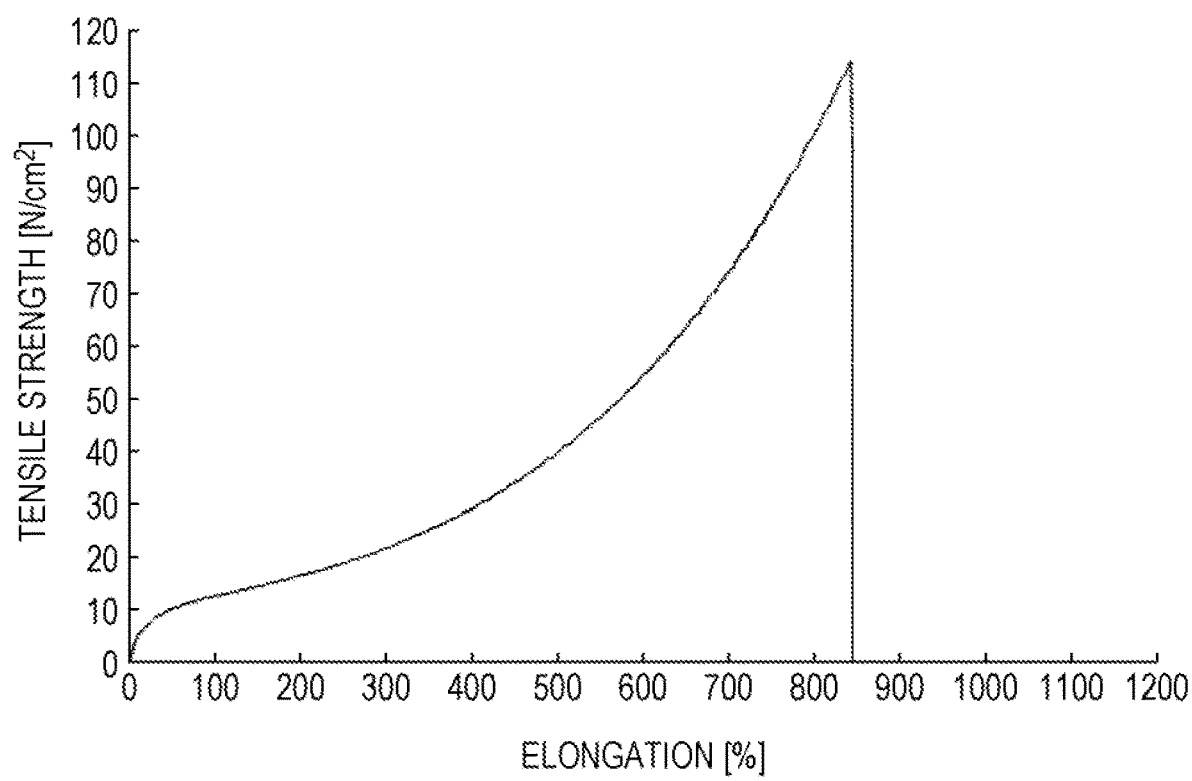

ADHESIVE SHEET AND ELECTRONIC DEVICE

TECHNICAL FIELD

The present invention relates to an adhesive sheet usable in various fields including production of electronic devices such as portable electronic devices and fixation of interior and exterior components of automobiles and buildings.

BACKGROUND ART

Adhesive sheets are used to produce various products for electronic devices, automobiles, etc. In the case of production of, for example, an electronic device, adhesive sheets are used for purposes such as fixation of two or more casings included in the electronic device and fixation of a rechargeable battery, a circuit board, etc.

One known example of the adhesive sheet usable in the above case is an adhesive sheet obtained by using an adhesive composition which is a polymer prepared by copolymerization of at least an alkyl acrylate, a hydroxyl group-containing monomer, vinyl acetate, and a carboxyl group-containing monomer (see, for example, PTL 1). In this adhesive composition, the ratio of the carboxyl group-containing monomer with respect to the polymer is 0.01 to 1.0 parts by mass. The adhesive composition contains a crosslinking agent and has a ball tack of 12 to 30.

As portable electronic devices are becoming widespread, the electronic devices are being used in various cases, and there is a need for adhesive sheets having both excellent peel adhesion and excellent push strength. The push strength is an adhesive strength determined as follows. For example, two or more adherends are bonded using an adhesive sheet. Then force is applied to the adherends in a direction perpendicular to the plane direction of the adhesive sheet, and the adhesion strength when the two or more adherends are disassembled (separated) is determined.

Particularly, as portable electronic devices are increased in screen size and reduced in thickness etc., the areas for application of the adhesive sheets are reduced, and the adhesive sheets are reduced in width. Under these circumstances, adhesive sheets having both excellent peel adhesion and excellent push strength have not been found.

In some cases, the portable electronic devices are required to have such a level of impact resistance that, when the portable electronic devices are, for example, dropped, the impact on the devices does not cause peeling of the adhesive sheets, separation of the adherends, etc. Particularly, as the portable electronic devices are increased in screen size and reduced in thickness etc., the areas for application of the adhesive sheets are reduced, and the adhesive sheets are reduced in width. Under these circumstances, there is a need for adhesive sheets having not only excellent peel adhesion and push strength but also excellent impact resistance. However, such adhesive sheets have not been obtained.

As the adhesive sheets are increasingly used in various application fields, the adhesive sheets are required to have various characteristics suitable for the application fields. Examples of these characteristics include durability (holding power under static load) which means that, even when certain stress caused by, for example, strain, is applied to a bonded portion obtained using an adhesive sheet for a long period of time, delamination, peeling, etc. causing practical problems do not occur. Excellent holding power under static load means that, when a certain load is applied to an adherend bonded using an adhesive in a direction perpendicular to its bonding surfaces, the adherend can resist delamination and peeling over time.

Particularly, as portable electronic terminals etc. are increased in screen size and reduced in thickness etc., the areas for application of the adhesive sheets are reduced, and the adhesive sheets are reduced in width. Under these circumstances, there is a need for adhesive sheets having excellent holding power under static load. However, such adhesive sheets have not been obtained.

CITATION LIST

Patent Literature

PTL 1: Japanese Unexamined Patent Application Publication No. 2011-168658

SUMMARY OF INVENTION

Technical Problem

A first object to be achieved by the present invention is to provide an adhesive sheet having excellent peel adhesion, excellent push strength, and excellent holding power under static load.

A second object to be achieved by the present invention is to provide an adhesive sheet having excellent peel adhesion, excellent push strength, excellent holding power under static load, and excellent impact resistance.

Solution to Problem

The present inventors have found that the use of an adhesive sheet including an adhesive layer having a tensile strength equal to or more than a prescribed value as determined from a stress-strain curve (a so-called S-S curve) can not only improve the peel adhesion but also improve the push strength and holding power under static load significantly.

The present inventors have also found that, when a foam substrate selected from foam substrates known as substrates and having specific average bubble diameters, specific average bubble diameter ratios, etc. is combined with the above adhesive layer having a prescribed tensile strength, excellent impact resistance can be imparted without loss of excellent peel adhesion, excellent push strength, and excellent holding power under static load.

Specifically, the present invention relates to an adhesive sheet having, on one side or both sides of a substrate, an adhesive layer (A) having a tensile strength of 6 $N/cm^2$ or more as determined from a stress-strain curve at a strain of 100%.

The present invention also relates to the adhesive sheet that is obtained using, as the substrate, a foam substrate which has average bubble diameters in machine and cross-machine directions of 160 μm or less, in which the ratio of [the average bubble diameter in the machine direction/an average bubble diameter in a vertical direction] and the ratio of [the average bubble diameter in the cross-machine direction/the average bubble diameter in the vertical direction] are 6 or less, and which has an interlaminar strength of 10 N/cm or more.

Advantageous Effects of Invention

The adhesive sheet of the present invention can have excellent peel adhesion, excellent push strength, and excellent holding power under static load simultaneously and can therefore be used in various fields including production of electronic devices such as portable electronic devices, fixation of automobile components, fixation of interior and exterior building materials, etc. Particularly, the adhesive sheet can be preferably used for fixation that requires high holding power under static load, such as fixation of two or more casings included in electronic devices such as mobile electronic devices, fixation of the casings to lens components, fixation of the casings to rechargeable batteries, etc.

The adhesive sheet of the present invention obtained using the specific foam substrate has excellent peel adhesion, excellent push strength, excellent holding power under static load, and excellent impact resistance and can therefore be preferably used to produce, for example, mobile electronic devices that may be subjected to an impact such as a drop impact.

BRIEF DESCRIPTION OF DRAWINGS

FIG. 1 shows a stress-strain curve of an adhesive layer included in an adhesive tape obtained in Example 12.

DESCRIPTION OF EMBODIMENTS

The adhesive sheet of the present invention is characterized by including, on one side or both sides of a substrate, an adhesive layer (A) having a tensile strength of 6 N/cm$^2$ or more as determined from a stress-strain curve at a strain of 100%.

The adhesive layer used to form the adhesive sheet of the present invention has a tensile strength of 6 N/cm$^2$ or more as determined from a stress-strain curve at a strain of 100%.

The tensile strength is determined as follows. 50 μm-thick adhesive layers are stacked to obtain an adhesive layer test piece having a thickness of about 400 μm, a gauge length of 2 cm, and a width of 1 cm. The test piece is subjected to a tensile test using a tensile tester at a tensile speed of 300 mm/minute in a measurement environment at a temperature of 23° C. and a humidity of 50% to measure a stress-strain curve (a so-called S-S curve). The tensile strength is a value at a strain of 100% in the stress-strain curve.

In an adhesive sheet including an adhesive layer having a tensile strength of less than 6 N/cm$^2$, excellent peel adhesion and excellent push strength may not be obtained simultaneously, or practically sufficient holding power under static load may not be achieved.

No particular limitation is imposed on the upper limit of the tensile strength, but the tensile strength is preferably 30 N/cm or less and more preferably 25 N/cm$^2$ or less. The tensile strength is still more preferably 20 N/cm$^2$ or less because the capabilities of the adhesive sheet such as the peel adhesion, push strength, and holding power under static load can be well balanced.

The adhesive layer (A) used has a thickness of preferably 1 μm to 150 μm, more preferably 5 μm to 100 μm, and still more preferably 10 μm to 80 μm.

The adhesive layer (A) can be formed using any of various adhesives. Particularly, the adhesive layer (A) is preferably an adhesive layer formed using an adhesive containing, for example, an acrylic polymer (a1), a tackifying resin (a2), and a crosslinking agent (a3), because the adhesive layer formed can have a specific tensile strength.

The tensile strength of the adhesive layer (A) used that is determined from a stress-strain curve at a strain of 500% is preferably 12 N/cm$^2$ or more, more preferably 13 N/cm$^2$ or more, still more preferably 15 N/cm$^2$ or more, yet more preferably 17 N/cm$^2$ or more, and particularly preferably 19 N/cm or more. The upper limit of the tensile strength is preferably 70 N/cm$^2$ or less, and an adhesive layer having a tensile strength of 65 N/cm$^2$ or less is used more preferably. The use of the adhesive layer having a tensile strength within the above range as determined from the stress-strain curve at a strain of 500% is more preferred because the capabilities of the adhesive sheet such as the peel adhesion, push strength, holding power under static load, and impact resistance can be well balanced.

The acrylic polymer (a1) that may be contained in the adhesive has an acid value within the range of preferably 1 to 50, more preferably 10 to 50, and still more preferably 25 to 40. This is because the use of the acrylic polymer (a1) having an acid value within the above range allows the tensile strength of the adhesive layer (A) to be set within a specific range, so that the adhesive layer formed can have particularly excellent peel adhesion, excellent push strength, excellent holding power under static load, and good impact resistance. Preferably, the acid value is mainly due to carboxyl groups. The acid value is the number of milligrams of potassium hydroxide required to neutralize acid groups present in the acrylic polymer (a1) solution.

The acrylic polymer (a1) used is preferably an acrylic polymer having an alicyclic structure, because the adhesive layer formed can have particularly excellent peel adhesion, excellent push strength, and excellent holding power under static load.

Examples of the alicyclic structure include a cyclobutyl group, a cyclopentyl group, a cyclohexyl group, a cycloheptyl group, a cyclooctyl group, a propylcyclohexyl group, a tricyclo[5,2,1,0,2,6]decyl group, a bicyclo[4,3,0]-nonyl group, a tricyclo[5,3,1,1]dodecyl group, a propyltricyclo[5,3,1,1]dodecyl group, a norbornene group, an isobornyl group, a dicyclopentanyl group, and an adamantyl group. Of these, a cyclohexyl group, a norbornene group, an isobornyl group, and an adamantyl group are preferable because the adhesive sheet obtained can have particularly excellent peel adhesion, particularly excellent push strength, and particularly excellent holding power under static load.

The acrylic polymer (a1) used has a weight average molecular weight of preferably 800,000 or more because the adhesive sheet obtained can have particularly excellent peel adhesion, particularly excellent push strength, and particularly excellent holding power under static load. The acrylic polymer (a1) used has a weight average molecular weight within the range of more preferably 800,000 to 3,000,000 and still more preferably 1,000,000 to 2,200,000. This is because the tensile strength of the adhesive layer (A) can be set within a specific range, so that the adhesive layer obtained can have excellent peel adhesion, excellent push strength, and holding power under static load simultaneously. The weight average molecular weight is a standard polystyrene-equivalent weight average molecular weight measured using a gel permeation chromatograph (GPC).

The measurement of the molecular weight by the GPC method is performed using a GPC (HLC-8329GPC) manufactured by TOSOH Corporation, and the molecular weight measured is a polystyrene-equivalent value.

Sample concentration: 0.5% by mass (tetrahydrofuran solution)
Sample injection volume: 100 μL
Eluent: THF
Flow rate: 1.0 mL/minute
Measurement temperature: 40° C.
Main column: TSKgel GMHHR-H(20)×2
Guard column: TSKgel HXL-H
Detector: differential refractometer
Molecular weight of standard polystyrene: 10,000 to 20,000,000 (manufactured by TOSOH Corporation)

The acrylic polymer (a1) used has a glass transition temperature of preferably −15° C. or lower. The acrylic polymer (a1) used has a glass transition temperature of more preferably −45° C. to −20° C. because the adhesive sheet obtained can have particularly excellent peel adhesion, particularly excellent push strength, and excellent holding power under static load. The glass transition temperature is a calculated value computed using the FOX equation.

The acrylic polymer (a1) is contained in an amount of preferably 5% by mass to 80% by mass based on the total amount of the adhesive usable to form the adhesive layer (A). More preferably, the acrylic polymer (a1) is contained in an amount of 10% by mass to 50% by mass, because good coating workability can be maintained.

The acrylic polymer (a1) used is preferably an acrylic polymer obtained by polymerization of a monomer component having a vinyl group (a vinyl monomer component).

To form an adhesive layer having a prescribed tensile strength, the vinyl monomer component used may be a vinyl monomer mixture in which the content of a vinyl monomer other than a (meth)acrylic monomer such as vinyl acetate, styrene, or a vinyl monomer having a nitrogen atom, e.g., N-vinyl-2-pyrrolidone, with respect to the total amount of the vinyl monomer component is 5% by mass or less, preferably 3% by mass or less, and more preferably 1% by mass or less.

To form an adhesive layer having a prescribed tensile strength, the vinyl monomer component used includes an alkyl (meth)acrylate that forms a homopolymer having a glass transition temperature of 100° C. or higher, and the content of the alkyl (meth)acrylate with respect to the total amount of the vinyl monomer component is preferably 1% by mass or less, more preferably 0.5% by mass or less, and particularly preferably 0.1% by mass or less. Specific examples of the alkyl (meth)acrylate with a glass transition temperature of 100° C. or higher include methyl methacrylate.

The vinyl monomer used may be, for example, a vinyl monomer having a hydroxyl group, a vinyl monomer having an acid group, or an alkyl (meth)acrylate.

Examples of the vinyl monomer having a hydroxyl group and usable for producing the acrylic polymer (a1) include (meth)acrylic monomers having a hydroxyl group such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 2-hydroxyhexyl (meth)acrylate, 6-hydroxyhexyl (meth)acrylic, 8-hydroxyoctyl (meth)acrylate, 10-hydroxydecyl (meth)acrylate, and 12-hydroxylauryl (meth)acrylate.

Of these, 4-hydroxybutyl (meth)acrylate is used preferably as the vinyl monomer having a hydroxyl group. 4-Hydroxybutyl acrylate is used more preferably because an adhesive layer having a prescribed tensile strength can be formed more easily than when 2-hydroxyethyl (meth)acrylate, for example, is used, so that the adhesive sheet obtained can have particularly excellent peel adhesion, particularly excellent push strength, and particularly excellent holding power under static load.

The vinyl monomer having a hydroxyl group is used in an amount within the range of preferably 0.01% by mass to 0.2% by mass and more preferably 0.01% by mass or more and less than 0.1% by mass with respect to the total amount of the monomer component. Still more preferably, the vinyl monomer having a hydroxyl group is used in an amount within the range of 0.02% by mass to 0.08% by mass because the tensile strength of the adhesive layer (A) can be set within a specific range, so that the adhesive sheet obtained can have particularly excellent peel adhesion, particularly excellent push strength, and particularly excellent holding power under static load.

Examples of the vinyl monomer having an acid group and usable for producing the acrylic polymer (a1) include: (meth)acrylic monomers having a carboxyl group such as acrylic acid, methacrylic acid, carboxyethyl (meth)acrylate, carboxypentyl (meth)acrylate, itaconic acid, itaconic anhydride, maleic acid, maleic anhydride, fumaric acid, and crotonic acid; vinyl monomers having a sulfo group such as (meth)acrylamido propanesulfonic acid, sulfopropyl (meth)acrylate, (meth)acryloyloxynaphthalenesulfonic acid, sodium vinylsulfonate, styrenesulfonic acid, allylsulfonic acid, 2-(meth)acrylamido-2-methylpropane sulfonic acid, and (meth)acrylamido propanesulfonic acid; and (meth)acrylic monomers having a phosphate group such as 2-hydroxyethylacryloyl phosphate. Of these, a (meth)acrylic monomer having a carboxyl group is used preferably, and acrylic acid or methacrylic acid is more preferably used because the adhesive sheet obtained can have particularly excellent peel adhesion, particularly excellent push strength, and particularly excellent holding power under static load.

No particular limitation is imposed on the amount of the vinyl monomer having an acid group, so long as the acid value of the acrylic polymer (a1) is within a prescribed preferred range. The amount used of the vinyl monomer having an acid group is within the range of preferably 1% by mass to 30% by mass and more preferably 1% by mass to 15% by mass with respect to the total amount of the monomer component. The amount used of the vinyl monomer having an acid group is still more preferably within the range of 1% by mass to 7% by mass because the adhesive sheet obtained can have particularly excellent peel adhesion, particularly excellent push strength, and particularly excellent holding power under static load.

It is preferable that the vinyl monomer component used to produce the acrylic polymer (a1) includes a vinyl monomer having an alicyclic structure in order to introduce the alicyclic structure into the acrylic polymer (a1).

For example, cyclohexyl (meth)acrylate is preferably used as the vinyl monomer having an alicyclic structure, and cyclohexyl acrylate is used more preferably.

The vinyl monomer having an alicyclic structure is used in an amount of 0.5% by mass to 30% by mass with respect to the total amount of the vinyl monomer component because an adhesive layer having a prescribed tensile strength can be easily formed, so that the adhesive sheet obtained can have particularly excellent peel adhesion, particularly excellent push strength, and particularly excellent holding power under static load. More preferably, the vinyl monomer having an alicyclic structure is used in an amount of 4% by mass to 25% by mass.

If necessary, the vinyl monomer component usable for producing the acrylic polymer (a1) may further include an additional monomer other than those described above.

Examples of the additional vinyl monomer include alkyl (meth)acrylates such as methyl (meth)acrylate, ethyl (meth)acrylate, n-butyl (meth)acrylate, s-butyl (meth)acrylate, t-butyl (meth)acrylate, isobutyl (meth)acrylate, hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-undecyl (meth)acrylate, n-dodecyl (meth)acrylate, n-tridecyl (meth)acrylate, and n-tetradecyl (meth)acrylate, and these vinyl monomers may be used so long as the effects of the present invention are not impaired.

Of these, an alkyl (meth)acrylate in which the number of carbon atoms in the alkyl group is 4 to 12 is preferably used as the additional vinyl monomer. The use of n-butyl acrylate or 2-ethylhexyl acrylate is preferred because the adhesive sheet obtained can have particularly excellent peel adhesion, particularly excellent push strength, and particularly excellent holding power under static load.

The alkyl (meth)acrylate usable as the additional vinyl monomer and having an alkyl group having 4 to 12 carbon atoms is used in an amount within the range of preferably 50% by mass to 98% by mass and more preferably 60% by mass to 98% by mass with respect to the total amount of the monomer component used for producing the acrylic polymer (a1). Preferably, this alkyl (meth)acrylate is used in an amount within the range of 70% by mass to 96% by mass because the adhesive sheet obtained can have particularly excellent peel adhesion, particularly excellent push strength, and particularly excellent holding power under static load.

The n-butyl acrylate is used in an amount within the range of preferably 50% by mass to 98% by mass and more preferably 60% by mass to 98% by mass with respect to the total amount of the monomer component. Preferably, the n-butyl acrylate is used in an amount within the range of 70% by mass to 96% by mass because an adhesive layer having a prescribed tensile strength can be easily formed, so that the adhesive sheet obtained can have particularly excellent peel adhesion, particularly excellent push strength, and particularly excellent holding power under static load.

The additional vinyl monomer usable for producing the acrylic polymer (a1) may include a (meth)acrylic monomer having a nitrogen atom such as an acrylic monomer having an amido group, a (meth)acrylic monomer having an amino group, or a (meth)acrylic monomer having an imido group, so long as the effects of the present invention are not impaired.

Examples of the (meth)acrylic monomer having an amido group that can be used include acrylamide, methacrylamide, diethylacrylamide, N-vinylpyrrolidone, N,N-dimethylacrylamide, N,N-dimethylmethacrylamide, N,N-diethylacrylamide, N,N-diethylmethacrylamide, N,N'-methylenebisacrylamide, N,N-dimethylaminopropylacrylamide, N,N-dimethylaminopropylmethacrylamide, diacetone acrylamide, and acryloylmorpholine.

Examples of the (meth)acrylic monomer having an amino group that can be used include aminoethyl (meth)acrylate, N,N-dimethylaminoethyl (meth)acrylate, and N,N-dimethylaminopropyl (meth)acrylate.

Examples of the (meth)acrylic monomer having an imido group that can be used include cyclohexylmaleimide, isopropylmaleimide, N-cyclohexylmaleimide, and itaconimide.

As the additional vinyl monomer, vinyl monomers other than those described above such as cyano group-containing monomers, e.g., acrylonitrile and methacrylonitrile, glycidyl group-containing acrylic monomers, e.g., glycidyl (meth)acrylate, methylglycidyl (meth)acrylate, and allyl glycidyl ether, vinyl acetate, vinyl propionate, vinyl laurate, styrene, chlorostyrene, chloromethylstyrene, α-methylstyrene, other substituted styrenes, methyl vinyl ether, ethyl vinyl ether, and isobutyl vinyl ether may be used so long as the effects of the present invention are not impaired.

The acrylic polymer (a1) can be produced, for example, by supplying the monomer component in the presence of an organic solvent and subjecting the monomer component to radical polymerization. Specifically, the acrylic polymer (a1) can be produced by mixing and stirring the monomer component, a polymerization initiator, and an organic solvent at a temperature of preferably 40° C. to 90° C. to subject the monomer component to radical polymerization. The monomer component may be supplied all at once or in portions.

Examples of the polymerization initiator that can be used include: peroxides such as hydrogen peroxide, potassium persulfate, sodium persulfate, ammonium persulfate, benzoyl peroxide, and cumene hydroxy peroxide; and azo compounds such as 2,2'-azobis(2-methylbutyronitrile), 2,2'-azobis-(2-aminodipropane)dihydrochloride, 2,2'-azobis-(N,N'-dimethyleneisobutylamidine)dihydrochloride, and 2,2'-azobis{2-methyl-N-[1,1-bis(hydroxymethyl)-2-hydroxyethyl]propionamide}. Preferably, the amount of the polymerization initiator used is within the range of 0.01% by mass to 5% by mass with respect to the total amount of the monomer component.

The adhesive that can be used in the present invention is preferably an adhesive containing a tackifying resin (a2) because the adhesive sheet obtained can have particularly excellent peel adhesion, particularly excellent push strength, and particularly excellent holding power under static load.

Examples of the tackifying resin (a2) that can be used include rosin-based tackifying resins, polymerized rosin-based tackifying resins, polymerized rosin ester-based tackifying resins, rosin phenol-based tackifying resins, stabilized rosin ester-based tackifying resins, disproportionated rosin ester-based tackifying resins, hydrogenated rosin ester-based tackifying resins, terpene-based tackifying resins, terpene phenol-based tackifying resins, petroleum resin-based tackifying resins, and (meth)acrylate-based tackifying resins.

Particularly, the tackifying resin (a2) used is preferably a combination of at least two selected from the group consisting of polymerized rosin ester-based tackifying resins, disproportionated rosin ester-based tackifying resins, petroleum-based tackifying resins, and terpene phenol-based tackifying resins, because this combination has excellent compatibility with the acrylic polymer (a1), so that the adhesive sheet obtained can have particularly excellent peel adhesion, particularly excellent push strength, and particularly excellent holding power under static load. A combination of at least three selected from the above group is more preferred.

The tackifying resin (a2) used has a softening point of preferably 100° C. or higher and more preferably within the range of 120° C. to 170° C. because the adhesive sheet obtained can have particularly excellent peel adhesion, particularly excellent push strength, and particularly excellent holding power under static load.

The tackifying resin (a2) is used in an amount within the range of preferably 5 parts by mass to 60 parts by mass and more preferably 10 parts by mass to 50 parts by mass based on 100 parts by mass of the acrylic polymer (a1) because the adhesive sheet obtained can have particularly excellent peel adhesion, particularly excellent push strength, and particularly excellent holding power under static load.

Preferably, the adhesive used contains a crosslinking agent (a3) so that the adhesive layer formed can have particularly excellent cohesive force.

Examples of the crosslinking agent (a3) that can be used include isocyanate-based crosslinking agents, epoxy-based crosslinking agents, metal chelate-based crosslinking agents, and aziridine-based crosslinking agents. Particularly, the crosslinking agent used is preferably a crosslinking agent that can be easily mixed with the acrylic polymer (a1) produced in advance or its solution before use and allows the crosslinking reaction to proceed rapidly. Specifically, an isocyanate-based crosslinking agent or an epoxy-based crosslinking agent is used more preferably.

Examples of the isocyanate-based crosslinking agent that can be used include tolylene diisocyanate, naphthylene-1,5-diisocyanate, hexamethylene diisocyanate, diphenylmethane diisocyanate, xylylene diisocyanate, tolylene diisocyanate, trimethylolpropane adducts thereof, and triphenylmethane isocyanate. Of these, tolylene diisocyanate, trimethylolpropane adducts thereof, triphenylmethane isocyanate, etc. can be preferably used as the isocyanate-based crosslinking agent.

One indicator of the degree of crosslinking of the adhesive layer (A) formed using the adhesive containing the crosslinking agent (a3) is a gel fraction that is a measure of the amount of insoluble components after the adhesive layer (A) is immersed in toluene for 24 hours. The gel fraction is within the range of preferably 20% by mass to 70% by mass and more preferably 30% by mass to 60% by mass. The gel fraction is still more preferably within the range of 35% by mass to 55% by mass because the adhesive sheet obtained can have particularly excellent peel adhesion, particularly excellent push strength, and particularly excellent holding power under static load.

The gel fraction is a value measured by the following method.

The adhesive is applied to one side of a release liner to a dry thickness of 50 μm, dried at 100° C. for 3 minutes, and aged at 40° C. for 2 days to thereby form an adhesive layer. A 50 mm square piece cut from the product is used as a specimen.

Next, the mass (G1) of the specimen is measured, and then the specimen is immersed in a toluene solution at 23° C. for 24 hours. After the immersion, components of the specimen that are insoluble in toluene are filtrated and separated using a 300-mesh wire net and dried at 110° C. for 1 hour. The mass (G2) of the residue is measured, and the gel fraction is determined using the following formula.

Gel fraction (% by mass)=($G2/G1$)×100

The adhesive used may contain, in addition to the above described components, additional components as needed.

Examples of the additional components that can be used include additives such as a plasticizer, a softener, an antioxidant, a flame retardant, glass and plastic fibers, glass and plastic balloons, glass and plastic beads, fillers, e.g., metal, metal oxide, and metal nitride fillers, coloring agents, e.g., pigments and dyes, a leveling agent, a thickener, a water repellent, and an antifoaming agent.

Preferably, the adhesive used contains, in addition to the acrylic polymer (a1), a solvent as needed, in order to impart good coating workability. Examples of the solvent include organic solvents and aqueous solvents such as water.

Examples of the organic solvent that can be used include toluene, ethyl acetate, butyl acetate, methyl ethyl ketone, hexane, acetone, cyclohexanone, 3-pentanone, acetonitrile, propionitrile, isobutyronitrile, valeronitrile, dimethyl sulfoxide, and dimethylformamide.

Examples of the adhesive sheet of the present invention include an adhesive sheet including the adhesive layer (A) disposed on one side or both sides of a nonwoven fabric substrate, a foam substrate, a resin film substrate, etc.

The adhesive sheet of the present invention can be produced, for example, by applying the adhesive to one side or both sides of the substrate using a knife coater, a roll coater, a die coater, etc. and then drying the adhesive. Alternatively, the adhesive sheet can be produced using a transfer method including applying the adhesive to the surface of a release liner in advance using a knife coater, a roll coater, a die coater, etc., drying the adhesive to form an adhesive layer (A), and then laminating the adhesive layer (A) to one side or both sides of the substrate.

For example, a resin film substrate, a foam substrate, a nonwoven fabric substrate, cloth, paper, etc. can be used as the substrate included in the adhesive sheet. Particularly, the substrate used is preferably a foam substrate because the adhesive sheet obtained can have good impact resistance etc.

Particularly, when the adhesive sheet is required to have such a high level of impact resistance that it can be used to fix components included in portable electronic devices, it is preferable that the foam substrate used has average bubble diameters in machine and cross-machine directions of 160 μm or less, that the ratio of [the average bubble diameter in the machine direction/the average bubble diameter in a vertical direction] and the ratio of [the average bubble diameter in the cross-machine direction/the average bubble diameter in the vertical direction] are 6 or less, and that the interlaminar strength of the foam substrate is 10 N/cm or more. Moreover, the use of this specific foam substrate can impart excellent waterproof performance.

The average bubble diameters of the foam substrate in the machine and cross-machine directions are preferably 1.2 μm to 700 μm, more preferably 10 μm to 500 μm, and still more preferably 30 μm to 300 μm. The average bubble diameters are particularly preferably 50 μm to 200 μm because the number of closed cell present per unit width can be large even when the width of the adhesive sheet is small, so that excellent waterproof performance can be imparted.

To obtain an adhesive sheet that can maintain excellent peel adhesion, excellent push strength, and excellent holding power under static load and has highly excellent impact resistance, the foam substrate used has average bubble diameters in the machine and cross-machine directions of preferably 160 μm or less, more preferably 10 μm to 160 μm, still more preferably 30 μm to 150 μm, and particularly preferably 50 μm to 150 μm.

The average bubble diameter of the foam substrate in the vertical direction is within the range of preferably 1 μm to 150 μm, more preferably 5 μm to 100 μm, and still more preferably 10 μm to 60 μm, but this depends on the thickness of the foam substrate.

In the foam substrate, both the ratio of the average bubble diameter of the foam substrate in the machine direction to the average bubble diameter of the foam substrate in the vertical direction (the average bubble diameter in the machine direction/the average bubble diameter in the vertical direction) and the ratio of the average bubble diameter of the foam substrate in the cross-machine direction to the average bubble diameter of the foam substrate in the vertical direction (the average bubble diameter in the cross-machine direction/the average bubble diameter in the vertical direction) are preferably 0.3 to 15, more preferably 1 to 15, more preferably 1.2 to 15, still more preferably 1.2 to 10, particularly preferably 2 to 8, and particularly preferably 2 to 4. Particularly, when the above ratios of the foam substrate used are 1.2 or more, the flexibility of the foam substrate in the vertical direction can be improved, so that its followability to the surface of an adherend can be improved. When the adhesive sheet excellent in followability is used to bond adherends to each other, air that is likely to remain between the adhesive sheet and each of the adherends (at the bonding surfaces) can be easily squeezed out, so that the adhesion between the adhesive sheet and each of the adherends is high. Therefore, when the adhesive sheet is used to bond, for example, rigid bodies to each other, a gap through which water enters is less likely formed at the bonding surfaces, so that excellent waterproof performance can be imparted.

To obtain an adhesive sheet that can maintain excellent peel adhesion, excellent push strength, and excellent holding power under static load and has highly excellent impact resistance, both the ratio of [the average bubble diameter in the machine direction/the average bubble diameter in the vertical direction] and the ratio of [the average bubble diameter in the cross-machine direction/the average bubble diameter in the vertical direction] of the foam substrate used are preferably 6 or less, more preferably 0.3 to 5.5, more preferably 1.2 to 5.5, and still more preferably 1.2 to 4. When the above ratios of the foam substrate used are within the above range, excellent flexibility in the vertical direction can be obtained in addition to the excellent peel adhesion, the excellent push strength, the excellent holding power under static load, and the excellent impact resistance, so that the followability to surface irregularities of an adherend, waterproof performance, etc. can also be improved.

In the foam substrate, the ratio of the average bubble diameter of the foam substrate in the cross-machine direction to the average bubble diameter in the machine direction (the average bubble diameter in the cross-machine direction/ the average bubble diameter in the machine direction) is within the range of preferably 0.25 to 4, more preferably 0.33 to 3, and still more preferably 0.6 to 1.5. This ratio is particularly preferably within the range of 0.7 to 1.3 because variations in flexibility and tensile strength in the machine and cross-machine directions of the foam substrate are less likely to occur.

The average bubble diameters of the foam substrate in the machine, cross-machine, and vertical directions are values measured in the following manner.

First, the foam substrate is cut into a square of 1 cm in the cross-machine direction and 1 cm in the machine direction.

Next, a cut section of the cut foam substrate is magnified 200× using a digital microscope (product name "KH-7700," manufactured by HiROX). Images of cut sections of the foam substrate in the cross-machine and machine directions are taken.

Next, in the cut section of the foam substrate in the cross-machine direction, the bubble diameters of all the bubbles present in a region of the thickness× a cross-machine direction length (2 mm) are measured, and their average is computed. The above measurement is performed in 10 regions in the cut section, and the average of the ten computed average values is used as the average bubble diameter in the cross-machine direction.

In the cut section of the foam substrate in the machine direction, the bubble diameters of all the bubbles present in a region of the thickness× a machine direction length (2 mm) are measured, and their average is computed. The above measurement is performed in 10 regions in the cut section, and the average of the ten computed average values is used as the average bubble diameter in the machine direction.

The foam substrate that can be used has an interlaminar strength of 4 N/cm or more, preferably 6 N/cm to 150 N/cm, more preferably 10 N/cm to 100 N/cm, and more preferably 20 N/cm to 60 N/cm. The use of the foam substrate having an interlaminar strength within the above range allows an adhesive sheet having good followability to an adherend and good impact resistance to be obtained.

Particularly, to obtain an adhesive sheet that can maintain excellent peel adhesion, excellent push strength, and excellent holding power under static load and has highly excellent impact resistance, the foam substrate used has an interlaminar strength of preferably 10 N/cm or more, more preferably 20 N/cm or more, still more preferably 20 N/cm to 150 N/cm, yet more preferably 25 N/cm to 100 N/cm, and particularly preferably 25 N/cm to 60 N/cm.

In the adhesive sheet obtained by using the foam substrate having an interlaminar strength within the preferred range, even when interlaminar cracking occurs in the foam substrate in the step of peeling off the adhesive sheet from a finished or in-process electronic device such as a portable electronic device or in the step of separating casings or components bonded using the adhesive sheet, the adhesive sheet can be relatively easily removed from, for example, a component by pulling a remaining portion of the foam substrate remaining on the surface of the component.

The interlaminar strength is a value measured by the following method. A 50 μm-thick strong adhesion adhesive layer (which does not peel off adherends and a foam substrate evaluated for its interlaminar strength during a high-speed peeling test described below) is applied to each of opposite sides of the foam substrate and aged at 40° C. for 48 hours to produce a double-sided adhesive sheet for interlaminar strength measurement.

Next, one of the adhesive surfaces of the double-sided adhesive sheet having a width of 1 cm and a length of 15 cm (in the machine and cross-machine directions of the foam substrate) is lined with a 25 μm-thick polyester film. The resulting double-sided adhesive sheet is applied to a polyester film having a thickness of 50 μm, a width of 3 cm, and a length of 20 cm at 23° C. and 50% RH, and pressure is applied to the adhesive sheet by reciprocating a 2-kg roller once. The resulting adhesive sheet is left to stand at 60° C. for 48 hours. Then the resulting adhesive sheet is left to stand at 23° C. for 24 hours and then fixed to an attachment jig of a high-speed peeling tester at 23° C. and 50% RH such that the surface of the adhesive sheet bonded to the 50 μm-thick polyester film faces the attachment jig. The 25 μm-thick polyester film is pulled in a 90-degree direction at a tensile speed of 15 m/minute to tear the foam, and the maximum strength during this procedure is measured.

For example, the foam substrate used has a 25% compressive strength of preferably 20 kPa or more, more preferably 30 kPa or more, more preferably 80 kPa or more, more preferably 80 kPa to 1,000 kPa, and more preferably 120 kPa to 700 kPa. Particularly preferably, the foam substrate used has a 25% compressive strength of 200 kPa to 600 kPa because the adhesive sheet obtained can have excellent peel adhesion, excellent push strength, excellent holding power under static load, and excellent impact resistance even when the adherend has a surface with fine irregularities (a rough surface).

The 25% compressive strength is measured according to JIS K6767. Specifically, 25 mm-square pieces cut from a foam substrate are laminated to a thickness of about 10 mm, and the laminate is used as a specimen. The specimen is sandwiched between stainless steel plates having an area larger than the area of the specimen and is compressed at 23° C. by about 2.5 mm (25% of the original thickness) at a rate of 10 mm/minute, and the strength during this procedure is measured.

No particular limitation is imposed on the tensile elastic moduli of the foam substrate in the machine and cross-machine directions. The tensile elastic moduli are preferably 200 N/cm$^2$ or more and more preferably 300 to 1,800 N/cm$^2$.

Among the tensile elastic moduli in the machine and cross-machine directions, a lower one of the tensile elastic moduli is preferably 500 N/cm$^2$ or more, preferably 600 N/cm$^2$ to 1,800 N/cm$^2$, more preferably 600 N/cm$^2$ to 1,400 N/cm$^2$, and still more preferably 600 N/cm$^2$ to 1,200 N/cm$^2$.

A higher one of the tensile elastic moduli in the machine and cross-machine directions is preferably 700 N/cm$^2$ to 1,800 N/cm$^2$ and more preferably 800 N/cm$^2$ to 1,600 N/cm$^2$.

No particular limitation is imposed on the tensile elongation of the foam substrate at break in a tensile test. The tensile elongation in the machine direction is preferably 200% to 1,500%, more preferably 400% to 1,000%, still more preferably 450% to 950%, and particularly preferably 620% to 800%.

The use of the foam substrate having tensile elastic moduli and a tensile elongation within the above ranges can suppress, for example, a reduction in processability of the adhesive sheet and a reduction in its application workability that are due to the flexibility of the foam substrate. In addition, interlaminar fracture and tearing of the foam substrate are less likely to occur when the adhesive sheet is peeled from an adherend.

The tensile elastic moduli of the foam substrate in the machine and cross-machine directions are values measured according to JIS K6767. Specifically, the maximum strength of a sample formed from the foam substrate and having a gauge length of 2 cm and a width of 1 cm is measured using a TENSILON tensile tester in an environment at 23° C. and 50% RH under the measurement condition of a tensile speed of 300 mm/min.

Preferably, the foam substrate used has a closed-cell structure because entrance of water from a cut section of the foam substrate can be effectively prevented to impart good waterproof performance. As for the shape of the closed cell forming the closed-cell structure, it is preferable that the closed cell are shaped such that one or both of the average bubble diameters of the foam in the machine and cross-machine directions are longer than the average bubble diameter in the vertical direction. This is because the foam can have suitable followability and cushioning properties.

The foam substrate used has an apparent density of preferably 0.08 to 0.7 g/cm$^3$, more preferably 0.1 to 0.65 g/cm$^3$, still more preferably 0.2 to 0.65 g/cm$^3$, and particularly preferably 0.3 to 0.6 g/cm$^3$ because the interlaminar strength, compressive strength, average bubble diameters, etc. can be easily controlled within the above ranges and the adhesive sheet obtained can have excellent impact resistance and excellent adhesion to an adherend. The apparent density is a value measured according to JIS K6767. Specifically, rectangular pieces of 4 cm×5 cm cut from the foam substrate are prepared such that the total volume is about 15 cm$^3$, and the mass of the pieces is measured to compute the apparent density.

The interlaminar strength, compressive strength, tensile elastic moduli, etc. of the foam substrate can be appropriately controlled by changing the material and foam structure of the substrate used.

Examples of the foam substrate that can be used include: polyolefin-based foams obtained by using polyethylene, polypropylene, ethylene-propylene copolymerized polymers, and ethylene-vinyl acetate copolymerized polymers; polyurethane-based foams; rubber-based foams obtained by using acrylic rubber and other elastomers. Particularly, it is preferable to use a polyolefin-based foam as the foam substrate because a thin foam substrate having a closed-cell structure and excellent in followability to irregularities on the surface of an adherend, shock absorbing properties, etc., can be easily produced.

Preferably, the polyolefin-based foam used is a foam obtained by using a polyethylene-based resin because the foam substrate obtained can have a relatively uniform thickness and preferable flexibility.

The polyethylene-based resin is used in an amount of preferably 40% by mass or more, more preferably 50% by mass or more, still more preferably 60% by mass or more, and particularly preferably 100% by mass based on the total amount of the polyolefin resin used to produce the foam.

Preferably, the polyethylene-based resin used is a polyethylene-based resin obtained by using a metallocene compound containing a tetravalent transition metal as a polymerization catalyst. This is because, when the polyolefin-based foam is stretched, the resulting foam obtained can have a relatively uniform thickness.

The polyolefin-based resin used may include an additional polyolefin-based resin other than the polyethylene-based resin obtained using the metallocene compound containing a tetravalent transition metal.

Examples of the additional polyolefin-based resin include polyethylene-based resins other than that described above and polypropylene-based resins.

Examples of the polyethylene-based resin that can be used include linear low-density polyethylenes, low-density polyethylenes, medium-density polyethylenes, high-density polyethylenes, ethylene-α-olefin copolymers containing ethylene in an amount of 50% by mass or more, and ethylene-vinyl acetate copolymers containing ethylene in an amount of 50% by mass or more, and these may be used alone or in combination of two or more. Examples of the α-olefin included in the ethylene-α-olefin copolymers include propylene, 1-butene, 1-pentene, 4-methyl-1-pentene, 1-hexene, 1-heptene, and 1-octene.

No particular limitation is imposed on the polypropylene-based resin. Examples of the polypropylene-based resin include polypropylene and propylene-α-olefin copolymers containing propylene in an amount of 50% by mass or more, and these may be used alone or in combination of two or more. Examples of the α-olefin included in the propylene-α-olefin copolymers include ethylene, 1-butene, 1-pentene, 4-methyl-1-pentene, 1-hexene, 1-heptene, and 1-octene.

The polyolefin-based foam used may have a crosslinked structure. Particularly, when a thermal decomposition-type foaming agent is used to produce the polyolefin-based foam, it is preferable to use a polyolefin-based resin having a crosslinked structure formed therein, because the foam obtained can have a suitable foam structure.

The polyolefin-based foam can be produced, for example, by a method including: the step of supplying, to an extruder, a foamable polyolefin-based resin composition containing a thermal decomposition-type foaming agent, a foaming aid, a colorant, and a polyolefin-based resin containing 40% by mass or more of the polyethylene-based resin obtained by using the metallocene compound containing a tetravalent transition metal, melting and kneading the foamable polyolefin-based resin composition, and extruding the foamable polyolefin-based resin composition from the extruder into a sheet form to thereby produce a foamable polyolefin-based resin sheet; the step of crosslinking the foamable polyolefin-based resin sheet; the step of foaming the crosslinked foamable polyolefin-based resin sheet; and the step of melting or softening the obtained foamed sheet and then stretching the resulting foamed sheet in one or both of the machine and cross-machine directions. The step of stretching may be performed as needed and may be performed a plurality of times.

The step of crosslinking the foamable polyolefin-based resin sheet can be performed, for example, using a method in which the foamable polyolefin-based resin sheet is irradiated with ionizing radiation or a method in which a foamable polyolefin-based resin sheet obtained using a foamable polyolefin-based resin composition containing an organic peroxide is heated.

Examples of the ionizing radiation include an electron beam, α radiation, β radiation, and γ radiation. The dose of the ionizing radiation is appropriately controlled such that the gel fraction of the polyolefin-based resin foam substrate becomes preferably 5% by mass to 70% by mass, more preferably 20% by mass to 60% by mass, and still more preferably 25% by mass to 55% by mass. The dose of the ionizing radiation is preferably within the range of 5 to 200 kGy. To form a uniform crosslinked structure to thereby form a relatively uniform foam structure, it is preferable to irradiate the foamable polyolefin-based resin sheet from its opposite sides at the same irradiation dose.

Examples of the organic peroxide that can be used to form a crosslinked structure include 1,1-bis(t-butylperoxy)3,3,5-trimethylcyclohexane, 1,1-bis(t-butylperoxy)cyclohexane, 2,2-bis(t-butylperoxy)octane, n-butyl-4,4-bis(t-butylperoxy)valerate, di-t-butyl peroxide, t-butyl cumyl peroxide, dicumyl peroxide, α,α'-bis(t-butylperoxy-m-isopropyl)benzene, 2,5-dimethyl-2,5-di(t-butylperoxy)hexane, 2,5-dimethyl-2,5-di(t-butylperoxy)hexyne-3, benzoyl peroxide, cumyl peroxyneodecanate, t-butyl peroxybenzoate, 2,5-dimethyl-2,5-di(benzoylperoxy)hexane, t-butylperoxyisopropyl carbonate, and t-butylperoxyallyl carbonate. These may be used alone or in combination of two or more.

The organic peroxide is used in an amount within the range of preferably 0.01 parts by mass to 5 parts by mass and more preferably 0.1 parts by mass to 3 parts by mass based on 100 parts by mass of the polyolefin-based resin.

No particular limitation is imposed on the step of foaming the crosslinked foamable polyolefin-based resin sheet. This step may be performed, for example, using one or any combination of a method in which the resin sheet is heated by hot air etc., a method in which the resin sheet is heated by infrared rays, a method using a salt bath, and a method using an oil bath. Particularly, it is preferable to perform this step using a heating method using hot air or a heating method using infrared rays, in order to prevent the difference in appearance between the front and back sides of the polyolefin-based resin foam substrate from increasing.

The thermal decomposition-type foaming agent that can be used to foam the crosslinked foamable polyolefin-based resin sheet may be selected according to the expansion ratio of the foam substrate. The thermal decomposition-type foaming agent is used in an amount within the range of preferably 1 part by mass to 40 parts by mass and more preferably 1 part by mass to 30 parts by mass based on 100 parts by mass of the polyolefin-based resin.

The stretching step may be performed after the foamable polyolefin-based resin sheet is foamed or at the same time as the step of foaming the foamable polyolefin-based resin sheet.

The stretching step is the step of stretching the foamed sheet obtained in the previous step in a given direction as needed. When the foamed sheet is stretched in the cross-machine direction and the machine direction, the foamed sheet may be stretched in these directions simultaneously or may be stretched in one direction and then stretched in the other direction.

Examples of the method of stretching the foam substrate in the machine direction include: a method in which a long foamed sheet is wound while being cooled after foaming at a speed (winding speed) faster than the speed (feed speed) of feeding a long foamable polyolefin-based resin sheet to the foaming step to thereby stretch the foam substrate in the machine direction; and a method in which the foam substrate obtained is wound at a speed (winding speed) faster than the speed (feed speed) of feeding the foam substrate to the stretching step to thereby stretch the foam substrate in the machine direction.

In the former method, the foamable polyolefin-based resin sheet expands in the machine direction as a result of the foaming of the resin sheet itself. Therefore, when the foam substrate is stretched in the machine direction, it is preferable to adjust the feed speed and winding speed of the foam substrate in consideration of the amount of expansion in the machine direction as a result of the foaming of the foamable polyolefin-based resin sheet so that the foam substrate is stretched in the machine direction by an amount more than the amount of expansion.

A preferred method of stretching the foam substrate in the cross-machine direction includes: holding opposite ends, with respect to the cross-machine direction, of the foam substrate using a pair of holding members; and then moving the pair of holding members gradually in a direction in which the holding members are separated from each other to thereby stretch the foam substrate in the cross-machine direction. The foamable polyolefin-based resin sheet expands in the cross-machine direction as a result of the foaming of the resin sheet itself. Therefore, when the foam substrate is stretched in the cross-machine direction, it is necessary to adjust the stretching in consideration of the amount of expansion in the cross-machine direction as a result of the foaming of the foamable polyolefin-based resin sheet so that the foam substrate is stretched in the cross-machine direction by an amount more than the amount of expansion.

The stretch ratio of the polyolefin-based foam obtained through the above-described steps in the machine direction is within the range of preferably 1.1 to 2.0 and more preferably 1.2 to 1.5. The stretch ratio of the polyolefin-based foam substrate in the cross-machine direction is within the range of preferably 1.2 to 4.5 and more preferably 1.5 to 3.5.

The foam substrate may be colored for the purpose of imparting a design, light shielding capability, concealment characteristics, light reflectivity, lightfastness, etc. to the adhesive sheet of the present invention.

When light shielding capability, concealment characteristics, and lightfastness are imparted to the adhesive sheet, the foam substrate used is preferably colored in black.

Examples of the black colorant that can be used include carbon black, graphite, copper oxide, manganese dioxide, aniline black, perylene black, titanium black, cyanine black, activated carbon, ferrite, magnetite, chromium oxide, iron oxide, molybdenum disulfide, chromium complexes, complex oxide-based black dyes, and anthraquinone-based organic black dyes. Of these, carbon black is preferably used as the black colorant because of its cost, availability, insulating properties, and heat resistance to the temperature in the step of extruding the foamable polyolefin-based resin composition and to the temperature in the foaming step.

When a design, light reflectivity, etc. are imparted to the adhesive sheet of the present invention, it is preferable that the foam substrate used is colored in white.

Examples of the while colorant that can be used include: inorganic-based white colorants such as titanium oxide, zinc oxide, aluminum oxide, silicon oxide, magnesium oxide, zirconium oxide, calcium oxide, tin oxide, barium oxide, cesium oxide, yttrium oxide, magnesium carbonate, calcium carbonate, barium carbonate, zinc carbonate, aluminum hydroxide, magnesium hydroxide, calcium hydroxide, zinc hydroxide, aluminum silicate, calcium silicate, barium sulfate, calcium sulfate, barium stearate, zinc white, talc, silica, alumina, clay, kaolin, titanium phosphate, mica, gypsum, white carbon, diatomaceous earth, bentonite, lithopone, zeolite, and sericite; and organic-based white colorants such as silicone-based resin particles, acrylic-based resin particles, urethane-based resin particles, and melamine-based resin particles.

Aluminum oxide or zinc oxide is preferably used as the white colorant because of their cost, availability, insulating properties, and heat resistance to the temperature in the step of extruding the foamable polyolefin-based resin composition and to the temperature in the foaming step.

The foam substrate used may optionally contain additives such as a plasticizer, an antioxidant, a foaming aid, e.g., zinc oxide, a bubble nucleation adjusting agent, a thermal stabilizer, a flame retardant, e.g., aluminum hydroxide or magnesium hydroxide, an antistatic agent, glass and plastic hollow balloons and beads, metal powder, a filler, e.g., a metal compound, an electrically conductive filler, and a thermally conductive filler.

These additives are used in an amount within the range of preferably 0.1% by mass to 10% by mass and more preferably 1% by mass to 7% by mass with respect to the polyolefin-based resin, because the adhesive sheet obtained can have suitable followability and cushioning properties.

When the colorant, the thermal decomposition-type foaming agent, and the foaming aid are used, it is preferable to use, for example, a masterbatch containing the colorant and a resin highly compatible with the polyolefin-based resin, in order to prevent color unevenness in the final foam substrate and the formation of an extremely non-uniform foam structure.

In order to improve adhesion to the adhesive layer and other layers, the foam substrate may be subjected to surface treatment such as corona treatment, flame treatment, plasma treatment, hot-air treatment, ozone treatment, ultraviolet treatment, or application of an adhesion-facilitating agent. The surface treatment is performed such that a wetting index determined using a wetting reagent is 36 mN/m or more, preferably 40 mN/m, and more preferably 48 mN/m, in order to obtain good adhesion to the adhesive. The foam substrate with improved adhesion may be bonded to the adhesive layer in a continuous process. The foam substrate with improved adhesion may be temporarily wound and stored and then bonded to the adhesive layer in a separate process at a subsequent date.

When the foam substrate with improved adhesion is temporarily wound, it is preferable to wind the foam substrate through paper or a film made of, for example, polyethylene, polypropylene, or polyester in order to prevent blocking of the foam substrate. The film is preferably a polypropylene film or a polyester film having a thickness of 25 µm or less.

In addition to the foam substrate described above, a resin film substrate can be used as the substrate included in the adhesive sheet of the present invention.

Examples of the resin film substrate that can be used include plastic films such as polyester films, polyethylene films, polypropylene films, and polyvinyl chloride films. The resin film substrate used may be subjected to corona treatment or anchor coating treatment in order to improve the anchoring capability of the adhesive layer.

The substrate used has a thickness of preferably 1,500 µm or less and more preferably 1 µm to 1,500 µm.

When the substrate used is a resin film substrate, the resin film substrate used has a thickness of preferably 1 µm to 150 µm and more preferably 1 µm to 100 µm because it is easy for the adhesive sheet to have good workability and excellent followability to an adherend simultaneously.

When the substrate used is the foam substrate described above, the foam substrate used has a thickness of preferably 1,500 µm or less and more preferably 1,200 µm or less. Still more preferably, the foam substrate used has a thickness of 500 µm or less because excellent tape workability and excellent followability to an adherend can be imparted. Preferably, the lower limit of the thickness is 50 µm.

The adhesive sheet may include, in addition to the substrate and the adhesive layer, an additional layer as needed.

The additional layer is used in order to impart dimensional stability, good tensile strength, reworkability, etc. to the adhesive sheet. Examples of the additional layer include a laminate layer such as a polyester film, a light-shielding layer, a light reflecting layer, a thermal conductive layer such as a metal layer.

The adhesive sheet of the present invention has particularly excellent peel adhesion, push strength, and holding power under static load. When the specific foam substrate described above is used, the adhesive sheet of the present invention can have excellent impact resistance without deterioration in the excellent peel adhesion, push strength, and holding power under static load. Therefore, the adhesive sheet of the present invention can be used to, for example, fix components that limit the width of the narrowest portion of the adhesive sheet to 5 mm or less, preferably 0.1 mm to 3 mm, and more preferably 0.5 mm to 2.5 mm because of the limitations on the bonding portions, shapes, etc. of the components.

Such narrow width components are often used as components for industrial applications including portable electronic devices such as mobile phones, automobiles, building materials, OA and home-appliance industries, etc.

Specific examples of these components include two or more casings included in electronic terminals and lens components.

In an article such as an electronic device in which the adhesive sheet of the present invention is used to fix two or more casings or lens components, the fixed components are not easily detached upon impact such as drop impact, and the article has excellent waterproof performance.

EXAMPLES

The present invention will next be described more specifically by way of Examples and Comparative Examples.

[Preparation Example 1] Method for Producing Acrylic Polymer (A-1)

A reaction vessel equipped with a stirrer, a reflux condenser, a nitrogen introduction tube, and a thermometer was charged with 80.94 parts by mass of n-butyl acrylate, 5 parts by mass of 2-ethylhexyl acrylate, 10 parts by mass of cyclohexyl acrylate, 4 parts by mass of acrylic acid, 0.06 parts by mass of 4-hydroxybutyl acrylate, and 200 parts by mass of ethyl acetate, and the temperature of the mixture was increased to 72° C. under stirring while nitrogen was blown into the vessel.

Next, 2 parts by mass (solid content: 0.1% by mass) of a solution of 2,2'-azobis(2-methylbutyronitrile) in ethyl acetate prepared in advance was added to the above-prepared mixture, and the resulting mixture was held at 72° C. for 4 hours under stirring and then held at 75° C. for 5 hours.

Next, the above mixture was diluted with 98 parts by mass of ethyl acetate and filtrated using a 200-mesh wire net to thereby obtain an acrylic polymer (A-1) solution (non-volatile content: 40% by mass) having a weight average molecular weight of 1,600,000.

The weight average molecular weight is a standard polystyrene-equivalent weight average molecular weight measured using a gel permeation chromatograph (GPC) and was measured using the following method.

The measurement of the molecular weight by the GPC method was performed using a GPC (HLC-8329GPC) manufactured by TOSOH Corporation, and the molecular weight measured was a standard polystyrene-equivalent value.

Sample concentration: 0.5% by mass (tetrahydrofuran solution)
Sample injection volume: 100 μL
Eluent: THF (tetrahydrofuran)
Flow rate: 1.0 mL/minute
Measurement temperature: 40° C.
Main column: TSKgel GMHHR-H(20)×2
Guard column: TSKgel HXL-H
Detector: differential refractometer
Molecular weight of standard polystyrene: 10,000 to 20,000,000 (manufactured by TOSOH Corporation)

[Preparation Example 2] Method for Producing Acrylic Polymer (A-2)

An acrylic polymer (A-2) solution (non-volatile content: 40% by mass) having a weight average molecular weight of 1,640,000 was obtained by the same method as in Preparation Example 1 except that the amount of 4-hydroxybutyl acrylate used was changed from 0.06 parts by mass to 0.02 parts by mass and the amount of n-butyl acrylate used was changed from 80.94 parts by mass to 80.98 parts by mass.

[Preparation Example 3] Method for Producing Acrylic Polymer (A-3)

An acrylic polymer (A-3) solution (non-volatile content: 40% by mass) having a weight average molecular weight of 1,620,000 was obtained by the same method as in Preparation Example 1 except that the amount of 4-hydroxybutyl acrylate used was changed from 0.06 parts by mass to 0.1 parts by mass and the amount of n-butyl acrylate used was changed from 80.94 parts by mass to 80.9 parts by mass.

[Preparation Example 4] Method for Producing Acrylic Polymer (A-4)

An acrylic polymer (A-4) solution (non-volatile content: 40% by mass) having a weight average molecular weight of 1,320,000 was obtained by the same method as in Preparation Example 1 except that no cyclohexyl acrylate was used and the amount of 2-ethylhexyl acrylate used was changed from 5 parts by mass to 15 parts by mass.

[Preparation Example 5] Method for Producing Acrylic Polymer (A-5)

An acrylic polymer (A-5) solution (non-volatile content: 40% by mass) having a weight average molecular weight of 1,840,000 was obtained by the same method as in Preparation Example 1 except that the amount of cyclohexyl acrylate used was changed from 10 parts by mass to 20 parts by mass and the amount of n-butyl acrylate used was changed from 80.94 parts by mass to 70.94 parts by mass.

[Preparation Example 6] Method for Producing Acrylic Polymer (A-6)

An acrylic polymer (A-6) solution (non-volatile content: 40% by mass) having a weight average molecular weight of 1,630,000 was obtained by the same method as in Preparation Example 1 except that the amount of cyclohexyl acrylate used was changed from 10 parts by mass to 25 parts by mass, the amount of n-butyl acrylate used was changed from 80.94 parts by mass to 70.94 parts by mass, and no 2-ethylhexyl acrylate was used.

[Preparation Example 7] Method for Producing Acrylic Polymer (A-7)

An acrylic polymer (A-7) solution (non-volatile content: 40% by mass) having a weight average molecular weight of 1,640,000 was obtained by the same method as in Preparation Example 1 except that the amount of acrylic acid used was changed from 4 parts by mass to 2 parts by mass, the amount of n-butyl acrylate used was changed from 80.94 parts by mass to 97.94 parts by mass, and no 2-ethylhexyl acrylate was used.

[Preparation Example 8] Method for Producing Acrylic Polymer (A-8)

An acrylic polymer (A-8) solution (non-volatile content: 40% by mass) having a weight average molecular weight of 1,640,000 was obtained by the same method as in Preparation Example 1 except that the amount of acrylic acid used was changed from 4 parts by mass to 6 parts by mass, the amount of n-butyl acrylate used was changed from 80.94 parts by mass to 93.94 parts by mass, and no 2-ethylhexyl acrylate was used.

[Preparation Example 9] Method for Producing Acrylic Polymer (A-9)

An acrylic polymer (A-9) solution (non-volatile content: 40% by mass) having a weight average molecular weight of 1,780,000 was obtained by the same method as in Preparation Example 1 except that the amount of the 2,2'-azobis(2-methylbutyronitrile) solution used was changed from 2 parts by mass (solid content: 0.1% by mass) to 1 part by mass (solid content: 0.05% by mass).

[Preparation Example 10] Method for Producing Acrylic Polymer (A-10)

An acrylic polymer (A-10) solution (non-volatile content: 40% by mass) having a weight average molecular weight of 810,000 was obtained by the same method as in Preparation Example 1 except that the amount of the 2,2'-azobis(2-methylbutyronitrile) solution used was changed from 2 parts by mass (solid content: 0.1% by mass) to 10 parts by mass (solid content: 0.5% by mass).

[Comparative Preparation Example 1] Method for Producing Acrylic Polymer (B-1)

A reaction vessel equipped with a stirrer, a reflux condenser, a nitrogen introduction tube, and a thermometer was charged with 95.9 parts by mass of n-butyl acrylate, 4 parts by mass of acrylic acid, 0.1 of 2-hydroxyethyl acrylate, and 200 parts by mass of ethyl acetate, and the temperature of the mixture was increased to 72° C. under stirring while nitrogen was blown into the vessel.

Next, 2 parts by mass (solid content: 0.1% by mass) of a solution of 2,2'-azobis(2-methylbutyronitrile) in ethyl acetate prepared in advance was added to the above-prepared mixture, and the resulting mixture was held at 72° C. for 4 hours under stirring and then held at 75° C. for 5 hours.

Next, the above mixture was diluted with 98 parts by mass of ethyl acetate and filtrated using a 200-mesh wire net to thereby obtain an acrylic polymer (B-1) solution (non-volatile content: 40% by mass) having a weight average molecular weight of 1,860,000.

[Comparative Preparation Example 2] Method for Producing Acrylic Polymer (B-2)

A reaction vessel equipped with a stirrer, a reflux condenser, a nitrogen introduction tube, and a thermometer was charged with 63.9 parts by mass of n-butyl acrylate, 32 parts by mass of 2-ethylhexyl acrylate, 4 parts by mass of acrylic acid, 0.1 parts by mass of 4-hydroxybutyl acrylate, and 200 parts by mass of ethyl acetate, and the temperature of the mixture was increased to 72° C. under stirring while nitrogen was blown into the vessel.

Next, 2 parts by mass (solid content: 0.1% by mass) of a solution of 2,2'-azobis(2-methylbutyronitrile) in ethyl acetate prepared in advance was added to the above-prepared mixture, and the resulting mixture was held at 72° C. for 4 hours under stirring and then held at 75° C. for 5 hours.

Next, the above mixture was diluted with 98 parts by mass of ethyl acetate and filtrated using a 200-mesh wire net to thereby obtain an acrylic polymer (B-2) solution (non-volatile content: 40% by mass) having a weight average molecular weight of 750,000.

Example 1

100 Parts by mass of the acrylic polymer (A-1), 10 parts by mass of a polymerized rosin ester-based tackifying resin D-125 (manufactured by Arakawa Chemical Industries, Ltd.), and 15 parts by mass of a disproportionated rosin ester-based tackifying resin A-100 (manufactured by Arakawa Chemical Industries, Ltd.) were mixed and stirred in a vessel. Then ethyl acetate was added to the mixture to obtain an adhesive solution having a solid content of 31% by mass.

Next, 1.4 parts by mass of BURNOCK D-40 (manufactured by DIC Corporation, trimethylolpropane adduct of tolylene diisocyanate, isocyanate group content: 7% by mass, non-volatile content: 40% by mass) used as a cross-linking agent was added to 100 parts by mass of the above adhesive solution. The mixture was stirred and mixed until uniform and filtrated using a 100-mesh wire net to obtain an adhesive (p-1).

Next, an adhesive layer was produced by applying the adhesive to the surface of a release liner using a bar coater such that the dry thickness of the adhesive layer was 65 µm and then drying the adhesive layer at 80° C. for 3 minutes.

Next, the adhesive layer was applied to both side of a 170 µm-thick polyolefin-based foam substrate (apparent density: 0.45 g/cm$^3$, its surfaces had been subjected to corona treatment to adjust their wetting index to 54 mN/m) and then cured in an environment at 40° C. for 48 hours to produce an adhesive sheet (P-1). The tensile strength of the adhesive layer included in the adhesive sheet (P-1) was 10.8 N/cm$^2$ as measured by a method described later.

Example 2

An adhesive (p-2) and an adhesive sheet (P-2) were obtained by the same method as in Example 1 except that the acrylic polymer (A-2) solution was used instead of the acrylic polymer (A-1) solution and the amount of BURNOCK D-40 mixed was changed from 1.4 parts by mass to 1.6 parts by mass.

Example 3

An adhesive (p-3) and an adhesive sheet (P-3) were obtained by the same method as in Example 1 except that the acrylic polymer (A-3) solution was used instead of the acrylic polymer (A-1) solution and the amount of BURNOCK D-40 mixed was changed from 1.4 parts by mass to 1.2 parts by mass.

Example 4

An adhesive (p-4) and an adhesive sheet (P-4) were obtained by the same method as in Example 1 except that the acrylic polymer (A-4) solution was used instead of the acrylic polymer (A-1) solution.

Example 5

An adhesive (p-5) and an adhesive sheet (P-5) were obtained by the same method as in Example 1 except that the acrylic polymer (A-5) solution was used instead of the acrylic polymer (A-1) solution.

Example 6

An adhesive (p-6) and an adhesive sheet (P-6) were obtained by the same method as in Example 1 except that the acrylic polymer (A-6) solution was used instead of the acrylic polymer (A-1) solution.

Example 7

An adhesive (p-7) and an adhesive sheet (P-7)(P-7) were obtained by the same method as in Example 1 except that the acrylic polymer (A-7) solution was used instead of the acrylic polymer (A-1) solution.

Example 8

An adhesive (p-8) and an adhesive sheet (P-8) were obtained by the same method as in Example 1 except that the acrylic polymer (A-8) solution was used instead of the acrylic polymer (A-1) solution.

Example 91

An adhesive (p-9) and an adhesive sheet (P-9) were obtained by the same method as in Example 1 except that the acrylic polymer (A-9) solution was used instead of the acrylic polymer (A-1) solution.

Example 10

An adhesive (p-10) and an adhesive sheet (P-10) were obtained by the same method as in Example 1 except that the acrylic polymer (A-10) solution was used instead of the acrylic polymer (A-1) solution and the amount of BURNOCK D-40 mixed was changed from 1.4 parts by mass to 2.0 parts by mass.

Example 11

An adhesive (p-11) and an adhesive sheet (P-11) were obtained by the same method as in Example 1 except that a 200 μm-thick polyolefin-based foam substrate (apparent density: 0.2 g/cm$^3$) was used instead of the 170 μm-thick polyolefin-based foam substrate and the dry thickness of the adhesive layer was changed from 65 μm to 50 μm.

Example 12

An adhesive (p-12) and an adhesive sheet (P-12) were obtained by the same method as in Example 1 except that 10 parts by mass of the polymerized rosin ester-based tackifying resin D-125 (manufactured by Arakawa Chemical Industries, Ltd.), 5 parts by mass of a disproportionated rosin ester-based tackifying resin A-125 (manufactured by Arakawa Chemical Industries, Ltd.), and 15 parts by mass of a petroleum-based tackifying resin FTR6125 (manufactured by Mitsui Chemicals, Inc.) were used as tackifying resins.

Example 13

An adhesive (p-13) and an adhesive sheet (P-13) were obtained by the same method as in Example 1 except that a 25 μm-thick polyethylene terephthalate film was used instead of the 170 μm-thick polyolefin-based foam substrate.

Comparative Example 11

An adhesive (q-1) and an adhesive sheet (Q-1) were obtained by the same method as in Example 1 except that the acrylic polymer (B-1) solution was used instead of the acrylic polymer (A-1) solution and the amount of BURNOCK D-40 used was changed from 1.4 parts by mass to 1.2 parts by mass.

Comparative Example 21

An adhesive (q-2) and an adhesive sheet (Q-2) were obtained by the same method as in Example 1 except that the acrylic polymer (B-2) solution was used instead of the acrylic polymer (A-1) solution and the amount of BURNOCK D-40 used was changed from 1.4 parts by mass to 1.6 parts by mass.

[Method for Measuring Tensile Strength from Stress-Strain Curve at Strain of 100%]

One of the above-prepared adhesives was applied to one side of a release liner to a dry thickness of 50 μm, dried at 80° C. for 3 minutes, and aged at 40° C. for 48 hours to form an adhesive layer. Then a plurality of the adhesive layers were stacked to a thickness of about 400 μm to produce a test piece having a gauge length of 2 cm and a width of 1 cm.

The test piece was used to determine a tensile strength at a strain of 100% and a tensile strength at a strain of 500% from a stress-strain curve (a so-called S-S curve) measured using a tensile tester at a tensile speed of 300 mm/minute in a measurement environment at a temperature of 23° C. and a relative humidity of 50%.

[Method for Measuring Gel Fraction of Adhesive Layer]

One of the adhesive compositions was applied to one side of a release liner to a dry thickness of 50 μm, dried at 80° C. for 3 minutes, and aged at 40° C. for 2 days to form an adhesive layer, and a 50 mm-square piece cut from the adhesive layer was used as a specimen.

Next, the mass (G1) of the specimen was measured, and then the specimen was immersed in a toluene solution at 23° C. for 24 hours. After the immersion, components of the specimen that were insoluble in toluene were filtrated and separated using a 300-mesh wire net and dried at 110° C. for 1 hour. Then the mass (G2) of the residue was measured, and a gel fraction was determined using the following formula.

Gel fraction (% by mass)=(G2/G1)×100

[Method for Measuring 180° Peel Adhesion]

For each of the adhesive sheets produced in the Examples and Comparative Examples, the surface of the adhesive layer on one side was lined with a 25 μm-thick polyethylene terephthalate film in an environment at a temperature of 23° C. and a relative humidity of 50% RH, and the resulting adhesive sheet was cut into a length of 120 mm and a width of 20 mm.

Next, the surface of the adhesive layer on the other side was bonded to a stainless steel plate, and a 2 kg roller was reciprocated once on the upper surface of the adhesive sheet. The resulting adhesive sheet was left to stand in an environment at a temperature of 23° C. and a relative humidity of 50% RH for 1 hours to thereby produce a test piece 1 including the adhesive sheet press-bonded to the stainless steel plate.

Next, the stainless steel plate included in the test piece 1 was fixed, and the adhesive sheet was peeled off in a 180° direction using a TENSILON peel tester under the condition of a tensile speed of 300 mm/min, and the strength at this time was measured.

[Method for Measuring Push Strength]

Two cut adhesive sheets of a width of 5 mm and a length of 40 mm were bonded to a 2 mm-thick 50 mm square acrylic plate (ACRYLITE MR200 (trade name), MITSUBISHI RAYON Co., Ltd., Color: transparent) so as to be parallel to each other with a distance of 40 mm in an environment at a temperature of 23° C. and a relative humidity of 50% RH.

Next, the acrylic plate with the adhesive sheets bonded thereto was bonded to a 2 mm-thick ABS plate (TOUGHACE R EAR003, manufactured by Sumitomo Bakelite Co., Ltd., Color: natural, no embossing) with a rectangular shape of 100×150 mm and having a 10 mm-diameter hole at a central portion such that the center of the acrylic plate coincided with the center of the ABS plate, and pressure was applied to the plates by reciprocating a 2-kg roller once. The resulting plates were left to stand in an environment at a temperature of 23° C. and a relative humidity of 50% RH for 1 hour and used as a test piece.

Next, the acrylic plate was pressed at 10 mm/minute using a tensile tester having an 8 mm-diameter stainless steel probe attached thereto from the ABS side of the test piece through the hole of the ABS plate, and the strength at which the acrylic plate was peeled was measured.

[Method for Evaluating Holding Power Under Static Load]

One of the adhesive layers of a frame-shaped adhesive sheet having an outer shape of 14 mm×14 mm and an adhesive sheet width of 2 mm was bonded to a 2 mm-thick acrylic plate (ACRYLITE MR200 (trade name), MITSUBISHI RAYON Co., Ltd., Color: transparent) having an outer shape of 15 mm×15 mm in an environment at a temperature of 23° C. and a relative humidity of 50%.

Next, the acrylic plate with the adhesive sheet bonded thereto was bonded to a 2 mm-thick rectangular stainless steel plate with an outer shape of 65 mm×30 mm and having an 8 mm-diameter hole at a central portion so as to cover the hole, and a pressure of 50 N/cm² was applied to the bonded plates for 10 seconds to produce a test piece.

The test piece was held horizontally with the acrylic plate facing down in an atmosphere of a temperature of 40° C. and a relative humidity of 50%, and the opposite short side edges of the stainless steel plate were fixed. Next, a 400 g weight was attached to the central portion of the acrylic plate, and the test piece was left to stand under a downward load.

Next, the time (minutes) until the distance between the acrylic plate with the weight attached thereto and the stainless steel plate increased by 0.2 mm as compared to that before the start of the test was measured in an atmosphere of a temperature of 40° C. and a relative humidity of 50%. When the increase in the distance between the acrylic plate and the stainless steel plate was less than 0.2 mm even 24 hours after the start of the test, "1,440<" was placed in Tables below.

[Method for Evaluating Impact Resistance]

One of the above-prepared adhesive sheets was cut to produce two adhesive sheets with an outer shape of 2 mm×20 mm in an environment at a temperature of 23° C. and a relative humidity of 50%. These two rectangular adhesive sheets were bonded to one side of a rectangular acrylic plate (ACRYLITE MR200 (trade name), MITSUBISHI RAYON Co., Ltd., Color: transparent) with a thickness of 2 mm, a width of 25 mm, and a length of 50 mm at positions located near the short side edges of the plate and separated in a width direction by 45 mm so as to be parallel to each other.

Next, another acrylic plate with a thickness of 2 mm, a width of 25 mm, and a length of 50 mm was bonded to the bonding surfaces of the adhesive sheets, and a 2 kg roller was reciprocated once on the upper surfaces of the adhesive sheets. The resulting plates and sheets were left to stand in an environment at a temperature of 23° C. and a relative humidity of 50% for 24 hours to thereby produce a test piece 2.

The test piece 2 was bonded to a stainless steel-made drop measurement jig with a metal weight attached thereto (total mass: 300 g) using a double-sided adhesive sheet with a width of 25 mm and a length of 50 mm. The bonded product obtained was dropped from a height of 10 cm to a concrete surface 5 times with the test piece 2 facing downward in an environment at a temperature of 23° C. and a relative humidity of 50%, and then delamination of the adhesive sheets in the test piece and fracture of the substrates were evaluated. When no delamination etc. were found, the drop height was increased by 10 cm, and the test piece was dropped 5 times. Then delamination of the adhesive sheets and fracture of the substrates were checked. When no delamination and no fracture of the substrates were found, the drop height was increased by 10 cm, and the test was performed similarly. This procedure was repeated, and the drop height (cm) when delamination of the adhesive sheets in the test piece or fracture of the substrates was finally found was measured.

TABLE 1

|  | Example 1 | Example 2 | Example 3 | Example 4 | Example 5 | Example 6 | Example 7 |
|---|---|---|---|---|---|---|---|
| Adhesive sheet | P-1 | P-2 | P-3 | P-4 | P-5 | P-6 | P-7 |
| Calculated Tg (° C.) | −37.4 | −37.3 | −37.4 | −43.4 | −32.2 | −28.9 | −43.5 |
| Gel fraction (% by mass) | 46.3 | 45.4 | 46.8 | 45.7 | 46.0 | 46.4 | 47.3 |
| Tensile strength of adhesive layer (N/cm²) 100% | 10.8 | 10.2 | 13.5 | 8.3 | 17.5 | 20.6 | 7.7 |
| Tensile strength of adhesive layer (N/cm²) 500% | 19.0 | 16.3 | 21.5 | 19.9 | 61.0 | 65.0 | 14.0 |
| 180° peel adhesion (N/20 mm) | 19.5 | 20.5 | 17.8 | 18.2 | 23.0 | 25.0 | 18.2 |
| Push strength (N/4 cm²) | 218 | 202 | 210 | 210 | 225 | 236 | 192 |
| Holding power under static load (minutes) | 1100 | 1000 | 1100 | 600 | 1200 | 1400 | 300 |

TABLE 2

|  | Example 8 | Example 9 | Example 10 | Example 11 | Example 12 | Example 13 |
|---|---|---|---|---|---|---|
| Adhesive sheet | P-8 | P-9 | P-10 | P-11 | P-12 | P-13 |
| Calculated Tg (° C.) | −40.1 | −37.4 | −37.4 | −37.4 | −37.4 | −37.4 |
| Gel fraction (% by mass) | 45.2 | 46.1 | 43.9 | 46.3 | 46.3 | 46.3 |
| Tensile strength of adhesive layer (N/cm²) 100% | 11.4 | 13.0 | 6.3 | 10.8 | 12.0 | 10.8 |
| Tensile strength of adhesive layer (N/cm²) 500% | 17.3 | 19.0 | 17.7 | 19.0 | 39.8 | 19.0 |
| 180° peel adhesion (N/20 mm) | 20.0 | 19.0 | 22.0 | 19.0 | 19.8 | 19.0 |
| Push strength (N/4 cm²) | 222 | 218 | 179 | 240 | 218 | 190 |
| Holding power under static load (minutes) | 1440< | 1200 | 400 | 1000 | 1440< | 1000 |

TABLE 3

|  | Comparative Example 1 | Comparative Example 2 |
|---|---|---|
| Adhesive sheet | Q-1 | Q-2 |
| Calculated Tg (° C.) | −41.7 | −45.2 |
| Gel fraction (% by mass) | 48.0 | 31.0 |
| Tensile strength of adhesive layer (N/cm$^2$) 100% | 4.6 | 4.1 |
| 500% | 6.9 | 7.0 |
| 180° peel adhesion (N/20 mm) | 16.0 | 31.0 |
| Push strength (N/4 cm$^2$) | 163 | 155 |
| Holding power under static load (minutes) | 200 | 50 |

Example 14

100 Parts by mass of the acrylic polymer (A-1), 15 parts by mass of a polymerized rosin ester-based tackifying resin D-125 (manufactured by Arakawa Chemical Industries, Ltd.), and 10 parts by mass of a disproportionated rosin ester-based tackifying resin A-125 (manufactured by Arakawa Chemical Industries, Ltd.) were mixed and stirred in a vessel. Then ethyl acetate was added to the mixture to obtain an adhesive solution having a solid content of 31% by mass.

Next, 1.4 parts by mass of BURNOCK D-40 (manufactured by DIC Corporation, trimethylolpropane adduct of tolylene diisocyanate, isocyanate group content: 7% by mass, non-volatile content: 40% by mass) used as a crosslinking agent was added to 100 parts by mass of the above adhesive solution. The mixture was stirred and mixed until uniform and filtrated using a 100-mesh wire net to obtain an adhesive (p-14).

Next, an adhesive layer was produced by applying the adhesive to the surface of a release liner using a bar coater such that the dry thickness of the adhesive layer was 65 μm and then drying the adhesive layer at 80° C. for 3 minutes.

Next, the adhesive layer was applied to both side of a 170 μm-thick polyolefin-based foam substrate (apparent density: 0.45 g/cm$^3$, both the sides had been subjected to corona treatment to adjust the wetting index of the surfaces to 54 mN/m) and then cured in an environment at 40° C. for 48 hours to produce an adhesive sheet (P-1). The tensile strength of the adhesive layer included in the adhesive sheet (P-14) was 11.3 N/cm$^2$ as measured by a method described later.

Example 15

An adhesive (p-15) and an adhesive sheet (P-15) were obtained by the same method as in Example 14 except that the acrylic polymer (A-2) solution was used instead of the acrylic polymer (A-1) solution and the amount of BURNOCK D-40 mixed was changed from 1.4 parts by mass to 1.2 parts by mass.

Example 16

An adhesive (p-16) and an adhesive sheet (P-16) were obtained by the same method as in Example 14 except that the acrylic polymer (A-3) solution was used instead of the acrylic polymer (A-1) solution and the amount of BURNOCK D-40 mixed was changed from 1.4 parts by mass to 1.2 parts by mass.

Example 17

An adhesive (p-17) and an adhesive sheet (P-17) were obtained by the same method as in Example 14 except that the acrylic polymer (A-4) solution was used instead of the acrylic polymer (A-1) solution.

Example 18

An adhesive (p-18) and an adhesive sheet (P-18) were obtained by the same method as in Example 14 except that the acrylic polymer (A-7) solution was used instead of the acrylic polymer (A-1) solution.

Example 19

An adhesive (p-19) and an adhesive sheet (P-19) were obtained by the same method as in Example 14 except that the acrylic polymer (A-8) solution was used instead of the acrylic polymer (A-1) solution.

Example 20

An adhesive (p-20) and an adhesive sheet (P-20) were obtained by the same method as in Example 14 except that the acrylic polymer (A-9) solution was used instead of the acrylic polymer (A-1) solution.

Example 21

An adhesive (p-21) and an adhesive sheet (P-21) were obtained by the same method as in Example 14 except that the acrylic polymer (A-10) solution was used instead of the acrylic polymer (A-1) solution.

Example 22

An adhesive (p-22) and an adhesive sheet (P-22) were obtained by the same method as in Example 14 except that 10 parts by mass of the polymerized rosin ester-based tackifying resin D-125 (manufactured by Arakawa Chemical Industries, Ltd.), 5 parts by mass of the disproportionated rosin ester-based tackifying resin A-125 (manufactured by Arakawa Chemical Industries, Ltd.), and 15 parts by mass of a petroleum-based tackifying resin FTR6125 (manufactured by Mitsui Chemicals, Inc.) were used as tackifying resins.

Example 23

An adhesive (p-23) and an adhesive sheet (P-23) were obtained by the same method as in Example 14 except that a 140 μm-thick polyolefin-based foam substrate (apparent density: 0.40 g/cm$^3$) was used instead of the 170 μm-thick polyolefin-based foam substrate, and the dry thickness of the adhesive layer was changed from 65 μm to 80 μm.

Comparative Example 31

An adhesive (q-3) and an adhesive sheet (Q-3) were obtained by the same method as in Example 14 except that the acrylic polymer (B-1) solution was used instead of the acrylic polymer (A-1) solution, and the amount of BURNOCK D-40 used was changed from 1.4 parts by mass to 1.2 parts by mass.

Comparative Example 41

An adhesive (q-4) and an adhesive sheet (Q-4) were obtained by the same method as in Example 14 except that the acrylic polymer (B-2) solution was used instead of the acrylic polymer (A-1) solution, and the amount of BURNOCK D-40 used was changed from 1.4 parts by mass to 1.6 parts by mass.

TABLE 4

|  |  | Example 14 | Example 15 | Example 16 | Example 17 | Example 18 |
|---|---|---|---|---|---|---|
| Adhesive sheet | | P-14 | P-15 | P-16 | P-17 | P-18 |
| Calculated Tg (° C.) | | −37.4 | −37.3 | −37.4 | −43.4 | −43.5 |
| Gel fraction (% by mass) | | 46.5 | 45.8 | 46.6 | 45.5 | 47.0 |
| Tensile strength of adhesive layer (N/cm$^2$) | 100% | 11.3 | 10.6 | 14.0 | 8.5 | 8.1 |
| | 500% | 19.9 | 17.1 | 22.6 | 20.9 | 14.7 |
| 180° peel adhesion (N/20 mm) | | 20.5 | 21.5 | 18.7 | 19.1 | 19.2 |
| Push strength (N/4 cm$^2$) | | 230 | 211 | 223 | 224 | 202 |
| Holding power under static load (minutes) | | 1100 | 1100 | 1100 | 720 | 300 |

TABLE 5

|  |  | Example 19 | Example 20 | Example 21 | Example 22 | Example 23 |
|---|---|---|---|---|---|---|
| Adhesive sheet | | P-19 | P-20 | P-21 | P-22 | P-23 |
| Calculated Tg (° C.) | | −40.1 | −37.4 | −37.4 | −37.4 | −37.4 |
| Gel fraction (% by mass) | | 45.3 | 46.2 | 43.8 | 46.3 | 46.5 |
| Tensile strength of adhesive layer (N/cm$^2$) | 100% | 11.9 | 13.7 | 6.5 | 12.0 | 11.3 |
| | 500% | 18.2 | 19.9 | 18.6 | 39.8 | 19.9 |
| 180° peel adhesion (N/20 mm) | | 21.0 | 20.0 | 23.1 | 19.8 | 23.1 |
| Push strength (N/4 cm$^2$) | | 233 | 231 | 189 | 218 | 242 |
| Holding power under static load (minutes) | | 1440< | 1200 | 400 | 1440< | 1100 |

TABLE 6

|  |  | Comparative Example 3 | Comparative Example 4 |
|---|---|---|---|
| Adhesive sheet | | Q-3 | Q-4 |
| Calculated Tg (° C.) | | −41.7 | −45.2 |
| Gel fraction (% by mass) | | 48.0 | 31.0 |
| Tensile strength of adhesive layer (N/cm$^2$) | 100% | 4.6 | 4.1 |
| | 500% | 6.9 | 7.0 |
| 180° peel adhesion (N/20 mm) | | 16.0 | 31.0 |
| Push strength (N/4 cm$^2$) | | 168 | 161 |
| Holding power under static load (minutes) | | 200 | 50 |

Example 24

An adhesive layer was produced by applying the above-prepared adhesive (p-14) to the surface of a release liner using a bar coater such that the dry thickness of the adhesive layer was 65 μm and then drying the adhesive layer at 80° C. for 3 minutes.

Next, the adhesive layer was applied to both side of a 170 μm-thick polyolefin-based foam substrate (the average bubble diameter in the machine direction: 97 μm, the average bubble diameter in the cross-machine direction: 130 μm, the average bubble diameter in the vertical direction: 39 μm, [the average bubble diameter in the machine direction/the average bubble diameter in the vertical direction]=2.5, the ratio of [the average bubble diameter in the cross-machine direction/the average bubble diameter in the vertical direction]=3.3, interlaminar strength: 29.4 N/cm, apparent density: 0.42 g/cm$^3$, 25% compressive strength: 391 kPa, the surfaces had been subjected to corona treatment to adjust their wetting index to 54 mN/m). The adhesive layer was cured in an environment at 40° C. for 48 hours to thereby produce an adhesive sheet (P-24). The tensile strength of the adhesive layer included in the adhesive sheet (P-24) was 11.3 N/cm$^2$ as measured by the method described later.

Example 25

An adhesive sheet (P-25) was obtained by the same method as in Example 24 except that the adhesive (p-15) was used instead of the adhesive (p-14).

Example 26

An adhesive sheet (P-26) was obtained by the same method as in Example 24 except that the adhesive (p-16) was used instead of the adhesive (p-14).

Example 27

An adhesive sheet (P-27) was obtained by the same method as in Example 24 except that the adhesive (p-17) was used instead of the adhesive (p-1$^4$).

Example 28

An adhesive sheet (P-28) was obtained by the same method as in Example 24 except that the adhesive (p-18) was used instead of the adhesive (p-14).

Example 29

An adhesive sheet (P-29) was obtained by the same method as in Example 24 except that the adhesive (p-19) was used instead of the adhesive (p-14).

Example 30

An adhesive sheet (P-30) was obtained by the same method as in Example 24 except that the adhesive (p-20) was used instead of the adhesive (p-14).

Example 31

An adhesive sheet (P-31) was obtained by the same method as in Example 24 except that the adhesive (p-21) was used instead of the adhesive (p-14).

Example 32

An adhesive sheet (P-32) was obtained by the same method as in Example 24 except that the adhesive (p-22) was used instead of the adhesive (p-14).

Example 33

An adhesive sheet (P-33) was obtained by the same method as in Example 24 except that, instead of the 170 μm-thick polyolefin-based foam substrate used in Example 24, a 200 μm-thick polyolefin-based foam substrate (the average bubble diameter in the machine direction: 117 μm, the average bubble diameter in the cross-machine direction: 159 μm, the average bubble diameter in the vertical direction 43 μm, [the average bubble diameter in the machine direction/the average bubble diameter in the vertical direction]=2.7, the ratio of [the average bubble diameter in the cross-machine direction/the average bubble diameter in the vertical direction]=3.7, interlaminar strength: 24.5 N/cm, apparent density: 0.40 g/cm$^3$, 25% compressive strength: 360 kPa, the surfaces had been subjected to corona treatment to adjust their wetting index to 54 mN/m) was used, and that the dry thickness of the adhesive layer was changed from 65 μm to 50 μm.

Example 34

An adhesive sheet (P-34) was obtained by the same method as in Example 24 except that, instead of the 170 μm-thick polyolefin-based foam substrate used in Example 24, a 150 μm-thick polyolefin-based foam substrate (the average bubble diameter in the machine direction: 150 μm, the average bubble diameter in the cross-machine direction: 121 μm, the average bubble diameter in the vertical direction: 32 μm, [the average bubble diameter in the machine direction/the average bubble diameter in the vertical direction]=4.7, the ratio of [the average bubble diameter in the cross-machine direction/the average bubble diameter in the vertical direction]=3.8, interlaminar strength: 26.9 N/cm, apparent density: 0.51 g/cm$^3$, 25% compressive strength: 521 kPa, the surfaces had been subjected to corona treatment to adjust their wetting index to 54 mN/m), and that the dry thickness of the adhesive layer was changed from 65 μm to 75 μm.

Comparative Example 5

An adhesive sheet (Q-5) was obtained by the same method as in Example 24 except that the adhesive (q-3) was used instead of the adhesive (p-14).

Comparative Example 6

An adhesive sheet (Q-6) was obtained by the same method as in Example 24 except that the adhesive (q-4) was used instead of the adhesive (p-14).

Example 35

An adhesive sheet (P-35) was obtained by the same method as in Example 1 except that, instead of the 170 μm-thick polyolefin-based foam substrate used in Example 24, a 200 μm-thick polyolefin-based foam substrate (the average bubble diameter in the machine direction: 173 μm, the average bubble diameter in the cross-machine direction: 210 μm, the average bubble diameter in the vertical direction: 42 μm, [the average bubble diameter in the machine direction/the average bubble diameter in the vertical direction]=4.1, the ratio of [the average bubble diameter in the cross-machine direction/the average bubble diameter in the vertical direction]=5.0, interlaminar strength: 12.9 N/cm, apparent density: 0.20 g/cm$^3$, 25% compressive strength: 52 kPa, the surfaces had been subjected to corona treatment to adjust their wetting index to 54 mN/m) was used, and that the dry thickness of the adhesive layer was changed from 65 μm to 50 μm.

TABLE 7

| | | Example 24 | Example 25 | Example 26 | Example 27 | Example 28 |
|---|---|---|---|---|---|---|
| Adhesive sheet | | P-24 | P-25 | P-26 | P-27 | P-28 |
| Calculated Tg | | −37.4 | −37.3 | −37.4 | −43.4 | −43.5 |
| Gel fraction (% by mass) | | 46.5 | 45.8 | 46.6 | 45.5 | 47.0 |
| Tensile strength of adhesive layer (N/cm$^2$) | 100% | 11.3 | 10.6 | 14.0 | 8.5 | 8.1 |
| | 500% | 19.9 | 17.1 | 22.6 | 20.9 | 14.7 |
| 180° peel adhesion (N/20 mm) | | 20.5 | 21.5 | 18.7 | 19.1 | 19.2 |
| Push strength (N/4 cm$^2$) | | 230 | 211 | 223 | 224 | 203 |
| Impact resistance (cm) | | 90 | 90 | 90 | 90 | 90 |

TABLE 7-continued

|  | Example 24 | Example 25 | Example 26 | Example 27 | Example 28 |
|---|---|---|---|---|---|
| Holding power under static load (minutes) | 1100 | 1100 | 1100 | 720 | 300 |

TABLE 8

|  | Example 29 | Example 30 | Example 31 | Example 32 | Example 33 | Example 34 |
|---|---|---|---|---|---|---|
| Adhesive sheet | P-29 | P-30 | P-31 | P-32 | P-33 | P-34 |
| Calculated Tg (° C.) | −40.1 | −37.4 | −37.4 | −37.4 | −37.4 | −37.4 |
| Gel fraction (% by mass) | 45.3 | 46.2 | 43.8 | 46.3 | 46.5 | 46.5 |
| Tensile strength 100% of adhesive layer (N/cm$^2$) | 11.9 | 13.7 | 6.5 | 12.0 | 11.3 | 11.3 |
| 500% | 18.2 | 19.9 | 18.6 | 39.8 | 19.9 | 19.9 |
| 180° peel adhesion (N/20 mm) | 21.0 | 20.0 | 23.1 | 19.8 | 22.0 | 19.5 |
| Push strength (N/4 cm$^2$) | 234 | 231 | 189 | 218 | 230 | 189 |
| Impact resistance (cm) | 90 | 90 | 90 | 90 | 100 | 80 |
| Holding power under static load (minutes) | 1440< | 1200 | 400 | 1440< | 1200 | 1100 |

TABLE 9

|  | Comparative Example 5 | Comparative Example 6 | Example 35 |
|---|---|---|---|
| Adhesive sheet | Q-5 | Q-6 | P-35 |
| Calculated Tg (° C.) | −41.7 | −45.2 | −37.4 |
| Gel fraction (% by mass) | 48.0 | 31.0 | 46.3 |
| Tensile strength 100% of adhesive layer (N/cm$^2$) | 4.6 | 4.1 | 10.8 |
| 500% | 6.9 | 7.0 | 19.9 |
| 180° peel adhesion (N/20 mm) | 16.0 | 31.0 | 19.0 |
| Push strength (N/4 cm$^2$) | 168 | 161 | 250 |
| Impact resistance (cm) | 90 | 90 | 40 |
| Holding power under static load (minutes) | 200 | 50 | 1100 |

The invention claimed is:

1. An adhesive sheet comprising a substrate and an adhesive layer (A) disposed on one side or both sides of the substrate, the adhesive layer (A) having a tensile strength of 6 N/cm$^2$ to 30 N/cm$^2$ which is determined from a stress-strain curve at a strain of 100% and a tensile strength of 12 N/cm$^2$ to 70 N/cm$^2$ which is determined from a stress-strain curve at a strain of 500%, wherein
the adhesive layer (A) is made of an adhesive containing an acrylic polymer (a1) and has a gel fraction of 35% to 55% by mass, and
the acrylic polymer (a1) has been obtained by polymerization of a monomer component which comprises 0.01% by mass to 0.08% by mass of a vinyl monomer having a hydroxyl group based on a total amount of the monomer component.

2. The adhesive sheet according to claim 1, wherein the adhesive layer (A) has a thickness within the range of 1 μm to 100 μm.

3. The adhesive sheet according to claim 1, wherein the acrylic polymer (a1) has a weight average molecular weight of 800,000 or more.

4. The adhesive sheet according to claim 1, wherein in the acrylic polymer (a1), the content of a vinyl monomer other than a (meth)acrylic monomer is 5% by mass or less with respect to the total amount of a vinyl monomer component, and the content of an alkyl (meth)acrylate that forms a homopolymer having a glass transition temperature of 100° C. or higher is 1% by mass or less with respect to the total amount of the vinyl monomer component.

5. The adhesive sheet according to claim 1, wherein the substrate is a foam substrate.

6. The adhesive sheet according to claim 5, wherein average bubble diameters of the foam substrate in machine and cross-machine directions are 160 μm or less, the ratio of [the average bubble diameter in the machine direction/an average bubble diameter in a vertical direction] and the ratio of [the average bubble diameter in the cross-machine direction/the average bubble diameter in the vertical direction] are 6 or less, and the foam substrate has an interlaminar strength of 10 N/cm or more.

7. The adhesive sheet according to claim 5, wherein the foam substrate has a 25% compressive strength of 80 kPa or more.

8. The adhesive sheet according to claim 5, wherein the foam substrate has a thickness of 1,500 μm or less.

9. The adhesive sheet according to claim 1, wherein the adhesive sheet is used to fix a component included in an electronic device.

10. The adhesive sheet according to claim 9, wherein the adhesive sheet is used to fix at least two casings included in a portable electronic device or to fix a lens component to the casings.

11. The adhesive sheet according to claim 1, wherein the monomer component comprises 1% by mass to 15% by mass of a vinyl monomer having an acid group based on the total amount of the vinyl monomer component.

12. The adhesive sheet according to claim 1, wherein the monomer component comprises 70% by mass to 96% by mass of alkyl (meth)acrylate having 4 to 12 carbon atoms based on the total amount of the monomer component.

13. The adhesive sheet according to claim 1, wherein the acrylic polymer (a1) has an acid value within a range of 25 to 40.

14. An electronic device comprising at least two components bonded by the adhesive sheet according to claim 9.

* * * * *